US011386427B2

(12) United States Patent
Capuzzello

(10) Patent No.: US 11,386,427 B2
(45) Date of Patent: Jul. 12, 2022

(54) SYSTEM FOR SECURE AUTHENTICATION OF A USER'S IDENTITY IN AN ELECTRONIC SYSTEM FOR BANKING TRANSACTIONS

(71) Applicant: Krupteia SRL, Lecce (IT)

(72) Inventor: Alessandro Capuzzello, Milan (IT)

(73) Assignee: Krupteia SRL, Lecce (IT)

( * ) Notice: Subject to any disclaimer, the term of this patent is extended or adjusted under 35 U.S.C. 154(b) by 393 days.

(21) Appl. No.: 16/634,463

(22) PCT Filed: Jul. 25, 2018

(86) PCT No.: PCT/IB2018/055540
§ 371 (c)(1),
(2) Date: Jan. 27, 2020

(87) PCT Pub. No.: WO2019/021200
PCT Pub. Date: Jan. 31, 2019

(65) Prior Publication Data
US 2020/0250670 A1  Aug. 6, 2020

(30) Foreign Application Priority Data

Jul. 28, 2017  (IT) .................. 102017000087233

(51) Int. Cl.
*G06Q 20/40* (2012.01)
*G06Q 20/10* (2012.01)
(Continued)

(52) U.S. Cl.
CPC ......... *G06Q 20/401* (2013.01); *G06Q 20/108* (2013.01); *G06Q 20/3829* (2013.01);
(Continued)

(58) Field of Classification Search
None
See application file for complete search history.

(56) References Cited

U.S. PATENT DOCUMENTS

| 2014/0196118 A1* | 7/2014 | Weiss | H04L 63/107 |
| | | | 726/4 |
| 2014/0359290 A1* | 12/2014 | McCusker | H04L 9/006 |
| | | | 713/168 |
| 2017/0093811 A1 | 3/2017 | Dolev et al. | |

OTHER PUBLICATIONS

NPL1, "Random Numbers in Data Security Systems", downloaded from https://citeseerx.ist.psu.edu/viewdoc/download?doi=10.1.1.113.3231&rep=rep1&type=pdf, dated 1999 and attached as a PDF file, (Year: 1999).*

(Continued)

*Primary Examiner* — James D Nigh
*Assistant Examiner* — Margaret M Neubig
(74) *Attorney, Agent, or Firm* — Workman Nydegger

(57) ABSTRACT

System for secure authentication of a user's identity in an electronic system for banking transactions, said system comprising at least one first user apparatus subject to said secure authentication, and one or more further apparatuses bidirectionally communicating with each other and with said first apparatus, characterized in that:

said first apparatus ($\alpha$) and a second apparatus ($\beta$), belonging to said one or more further apparatuses, comprise an equal system generating a random number (M1) composed of any number of digits, said random number (M1) being divided into a first part and, respectively, a second part (SGN, CSGN), which are complementary and subsets of said random number (M1);

said first apparatus ($\alpha$) comprises means for generating, through said generating system, said first part (SGN) and sending it to said second apparatus ($\beta$);

said second apparatus ($\beta$) comprises means for generating, through said generating system, said second part (CSGN) via generation of one or more of said random number (M1), each one characterized by a corresponding first part (SGN'), and means for comparing said (Continued)

corresponding first part (SGN') thus generated with said first part (SGN) received from said first apparatus (α), determining said second part (CSGN) associated with the corresponding first part (SGN') equal to the first part (SGN) received, and means for sending said second part (CSGN) to said first apparatus (α), thereby attaining said secure authentication of the identity of a user associated with said first apparatus.

13 Claims, 18 Drawing Sheets

(51) Int. Cl.
*G06Q 20/38* (2012.01)
*H04L 9/06* (2006.01)
*H04L 9/08* (2006.01)
*H04L 9/32* (2006.01)

(52) U.S. Cl.
CPC .......... *H04L 9/0643* (2013.01); *H04L 9/0869* (2013.01); *H04L 9/3239* (2013.01); *G06Q 2220/00* (2013.01)

(56) References Cited

OTHER PUBLICATIONS

International Search Report and Written Opinion dated Oct. 22, 2018, issued in PCT Application No. PCT/IB2018/055540, filed Jul. 25, 2018.

Italian Search Report dated May 15, 2018, issued in Italian Application No. IT 201700087233, filed Jul. 28, 2017.

* cited by examiner

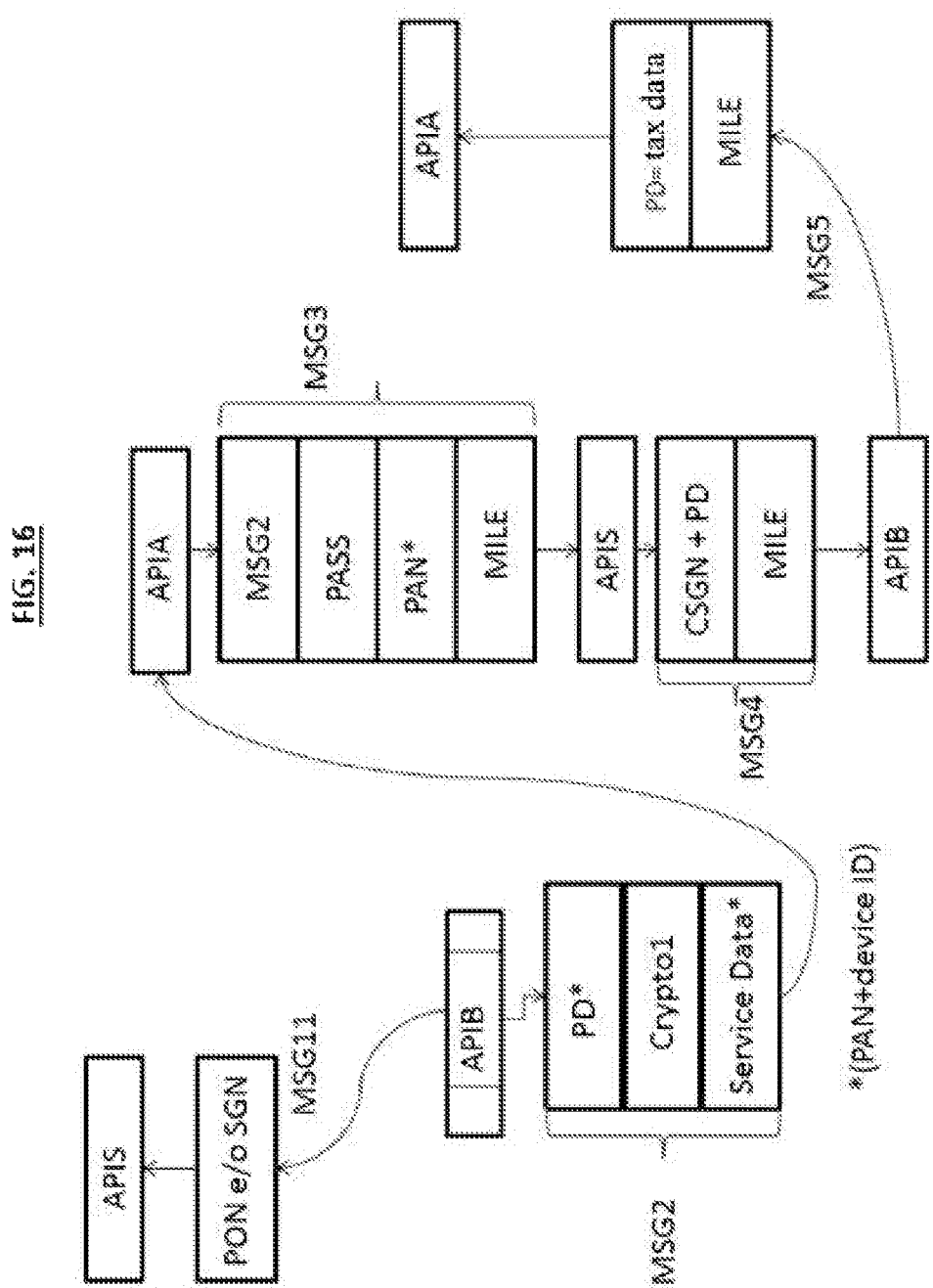

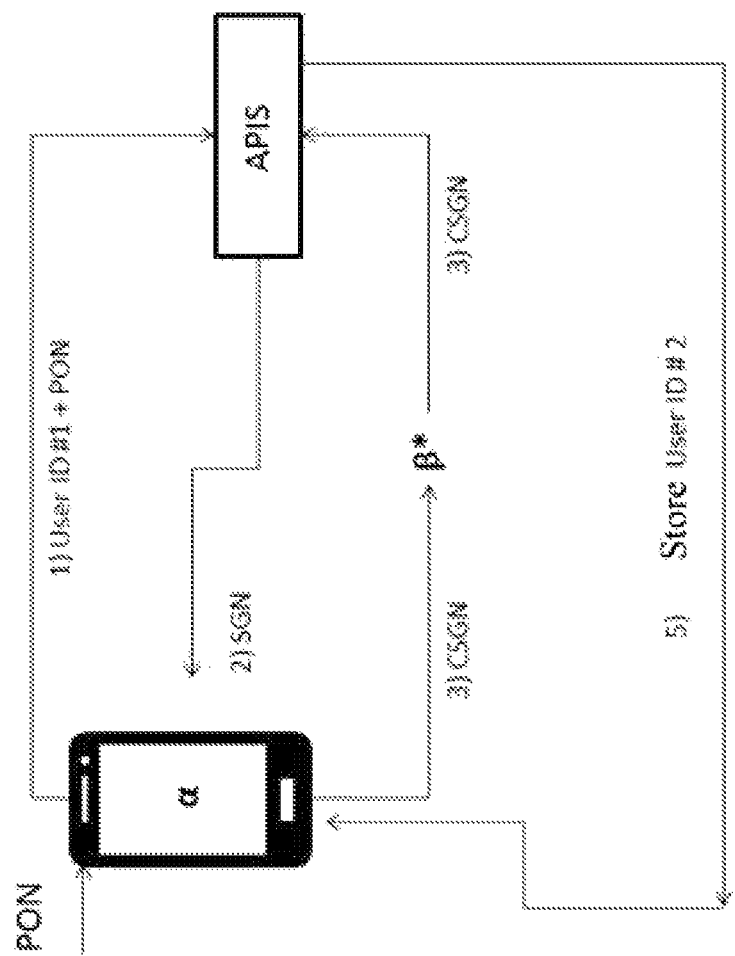

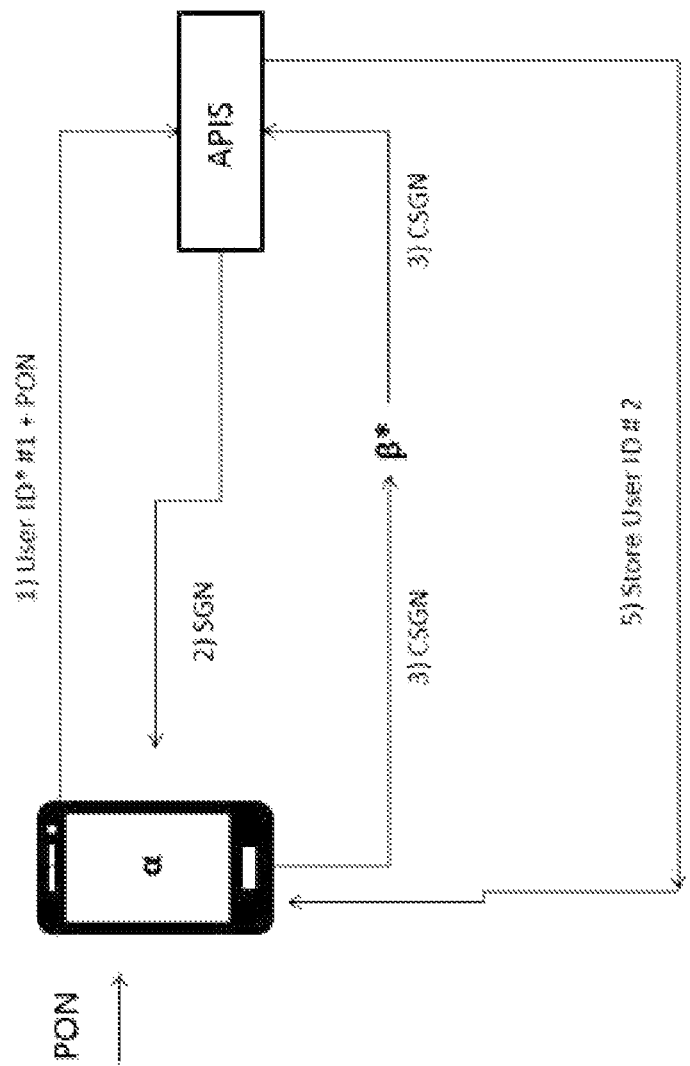

SYSTEM FOR SECURE AUTHENTICATION OF A USER'S IDENTITY IN AN ELECTRONIC SYSTEM FOR BANKING TRANSACTIONS

FIELD OF THE INVENTION

The present invention relates to a system implementing a method of user authentication which is alternative or additional to those currently in use, and which can be used by the interbank network over which cash dispensers and payment systems operate, and more specifically relates to a system for secure authentication of a user's identity in an electronic system for banking transactions.

BACKGROUND ART

The payment systems currently in use by the bank and credit-card circuit de facto offer better protection, in terms of security, to the economic operator who is to receive the payment than to the person who is making the payment.

This is due to several reasons, the most important one being related to the fact that the economic operator receiving payments is a commercial company that is paying a fixed cost and a variable cost to its own bank in order to use the electronic payment service (i.e. POS); hence the need for ensuring the highest possible level of security of the service, and thus the actual payment.

Payments in favour of such operators occur in most cases through the POS system and service. POS (Point of Sale) refers to both the electronic device and the associated banking service, which allows a vendor di accept and cash, directly on his bank account, electronic payments made by means of electronic currency, i.e. credit cards, debit cards and prepaid cards (hereafter such credit, debit and prepaid cards will be referred to as a whole as "payment cards") from debtor customers. Several cases are known wherein, due to the very lack of security in the POS system or device, paying users have suffered unauthorized withdrawals from their own payment card. Likewise, the phenomenon of payment card cloning and ghost cash withdrawals from ATMs has broadened the problem of illicit use of payment cards.

Most payment systems that utilize innovative procedures and technologies to ensure transaction security are based on the POS principle, i.e. communicating to third parties the data of the paying user's card and PIN (Personal Identification Number, i.e. the secret number to be used in order to authorize the transaction through the device in use at the point of sale for making the payment). For example, in U.S. Pat. No. 8,763,142 B2 (Tokenized payment processing schemes) a token is used, instead of the normal payment card number, in order to make a payment. The token is transferred to the seller's computerized terminal and used as a substitute for the credit card number. The security of such a system is guaranteed by the lack of correlation between the token and the corresponding payment card number. In case of remote payments, this system suffers from the typical vulnerability to reply attacks from a potential message interceptor: anybody intercepting the message with the token can then use the token to complete the transaction in his own favour without having to alter most of the message data; in fact, he will be able to generate an independent transaction towards the service provider, and the latter will make the payments as if he were a normal vendor.

Other systems (such as, for example, those described in US2014297537) allow the vendor or, in general, a third party to gain access to the payer's confidential data. This access possibility weakens any guarantee of security for the payer and his data, which may become the object of attacks from ill-intentioned people.

Other systems have been proposed wherein the payer's data are never accessible by third parties, as described, for example, in U.S. Pat. No. 8,720,771 B2, wherein the payer pays by interacting with a server of the payment system, which returns a unique code to the payer, who will have to exhibit it to the vendor/creditor. The system does not fully warrant the vendor or, in general, the person that must receive the payment, especially in remote sales, wherein the unique code needs to be transmitted to the vendor. A further drawback of U.S. Pat. No. 8,720,771 B2 is that the vendor must authenticate the payment system in order to be sure that the received unique code was generated upon an actual payment; any interaction with a malicious server imitating the payment server may result in the vendor not being paid.

The lack of surety that the payment has actually been made is the limit of many patents that have been proposed on this matter (see, for example, European patent application EP2702572-A1), which do not assure the vendor or creditor by means of robust systems certifying that the payment has actually been received.

Other payment systems based on the use of mobile devices propose some modifications to the terminal, so as to render it, de facto, similar to a POS, though it needs to be able to read the payment card in some way; the modifications to the mobile terminal that need to be made to the hardware part of the user terminal hinder the spread of such solutions, like the one described in U.S. Pat. No. 8,606,711.

Likewise, also patent U.S. Pat. No. 9,092,777 B1 (Credit card tokenization techniques) replaces the credit card number with a token that is used by the vendor to start the payment transaction.

Other patents, such as, for example, patent US2017/0093811, try to subdivide the part that must remain secret, e.g. a random number or, in general, "the secret", into N shares. Thus, patent US2017/0093811 follows Adi Shamir's theory, according to which it is sufficient to know a certain number of shares K, with K smaller than the N shares into which the number has been subdivided, to be able to reconstruct the secret. In substance, in patent US2017/0093811 the K shares are sent over K different paths, counting on the fact that a potential attack will not be able to intercept all the K paths. Should the attacker succeed in doing this, he would actually be able to reconstruct "the secret". As will be explained in regard to the invention presented herein, the attacker has no theoretically known means for reconstructing the whole random number, or "the secret", starting from just one part thereof that he may have intercepted. At any rate, in the present invention the above-mentioned Adi Shamir's theory will not be resorted to.

SUMMARY OF THE INVENTION

It is therefore an object of the present invention to propose a system for secure authentication of a user's identity in an electronic system for banking transactions, which can overcome all of the above-mentioned drawbacks.

The present invention relates to a system for secure authentication of a user's identity in an electronic system for banking transactions, said system comprising at least one first user apparatus subject to said secure authentication, and one or more further apparatuses bidirectionally communicating with each other and with said first apparatus, characterized in that:

said first apparatus and a second apparatus, belonging to said one or more further apparatuses, comprise an equal system generating a random number composed of any number of digits, said random number being divided into a first part and, respectively, a second part, which are complementary and subsets of said random number;

said first apparatus comprises means for generating, through said generating system, said first part and sending it to said second apparatus;

said second apparatus comprises means for generating, through said generating system, said second part via generation of one or more of said random number, each one characterized by a corresponding first part, and means for comparing said corresponding first part thus generated with said first part received from said first apparatus, determining said second part associated with the corresponding first part equal to the received first part, and means for sending said second part to said first apparatus, thereby attaining said secure authentication of the identity of a user associated with said first apparatus.

It is another object of the present invention to provide an electronic system for banking transactions comprising said system for secure authentication of a user's identity.

It is a further object of the present invention to provide a user terminal for banking transactions comprising said system for secure authentication of a user's identity.

It is a particular object of the present invention to provide a system for secure authentication of a user's identity in an electronic system for banking transactions as set out in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are only supplied by way of non-limiting example, wherein:

FIGS. 5 to 9 and 17, 18 show some variants of application of said sequences of steps on generic terminals;

FIGS. 14 to 16 show some operative flow charts of said sequences of steps.

In the drawings, the same reference numerals and letters identify the same items or components.

DESCRIPTION OF SOME EMBODIMENTS OF THE INVENTION

The present invention relates to a system for secure authentication of a user's identity, which uses a series of high-security procedures (or algorithms) for money payments or withdrawals that can be effected through portable or fixed devices, such as smartphones, smart cards, personal computers and the like.

The advantage offered by the present invention is that it warrants the transactions for the payee (hereafter referred to as vendor or creditor) and provides better security for the payer.

The present invention will describe some methods that can be executed by processors, computer systems and information technologies for implementing so-called "application programming interfaces" (API) automated and distributed among three main apparatuses: APIs of the payer user apparatus, hereafter referred to as APIA; APIs on the creditor (or vendor, as used in many examples described herein) user apparatus, hereafter referred to as APIB; the APIs of the systems and/or apparatuses of the service provider providing the payment service from A to B will be hereafter referred to as APIS. A fourth system of APIs, i.e. those of the banking system or systems managing payment cards or bank account access or, more generally, the payment account of user A or user B and interfacing to APIS, APIA and APIB, will be referred to as APIZ.

The networks useful for connecting APIA, APIB, APIZ and APIS may be of any kind: local connections through radio-frequency apparatuses, such as those used by RFIDs (Radio Frequency Identification), LAN (Local Area Network), optical data transport by video camera, WiFi connections, 3G or LTE (Long Term Evolution) or 4.5G or 5G mobile connections, the Internet network, or anyway connections over the Internet Protocol (IP) or over optical fiber or the like, and future evolutions of such technologies. The connections can also be effected via messaging over chat systems (such as, for example, Whatsapp, Facebook Messenger, Wechat, Telegram, Short Message Services (SMS), MMS, e-mail, or the like.

The above-described APIs may potentially be used in the so-called chatterbots. A chatterbot or chatbot is software designed for simulating an intelligent conversation with human beings through the use of voice or text, and is mostly used for implementing services by using the natural language in messages or conversations.

In accordance with some basic aspects of the present invention, it is provided for generating a random number M1 composed of any number of digits; such number M1 is divided into two parts: SGN and CSGN. The two parts SGN and CSGN are complementary and subsets of M1, and therefore the methods that can be used by those skilled in the art in order to derive SGN and CSGN from M1 are numerous.

Figure 1:
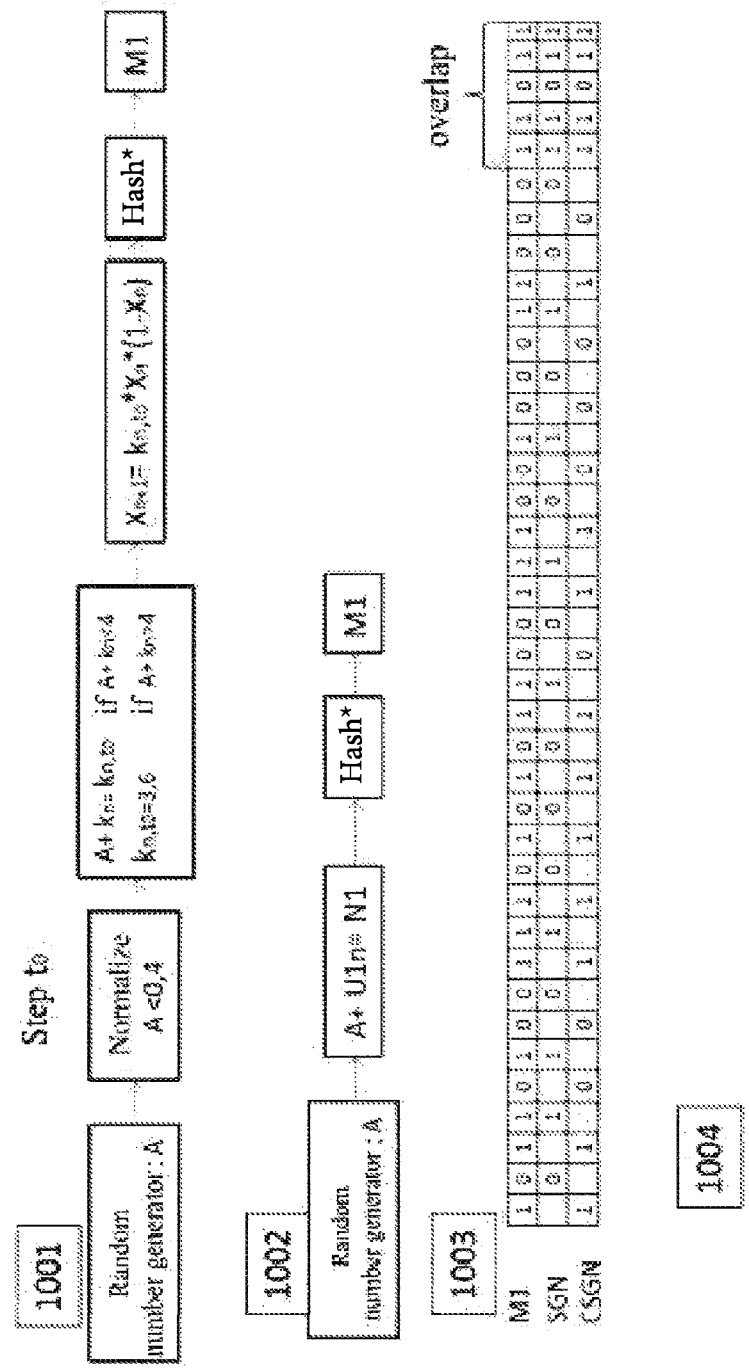
FIGS. 1 to 4 show some variants of sequences of steps carried out by the system for secure authentication of a user's identity according to the present invention.
Figure 2:
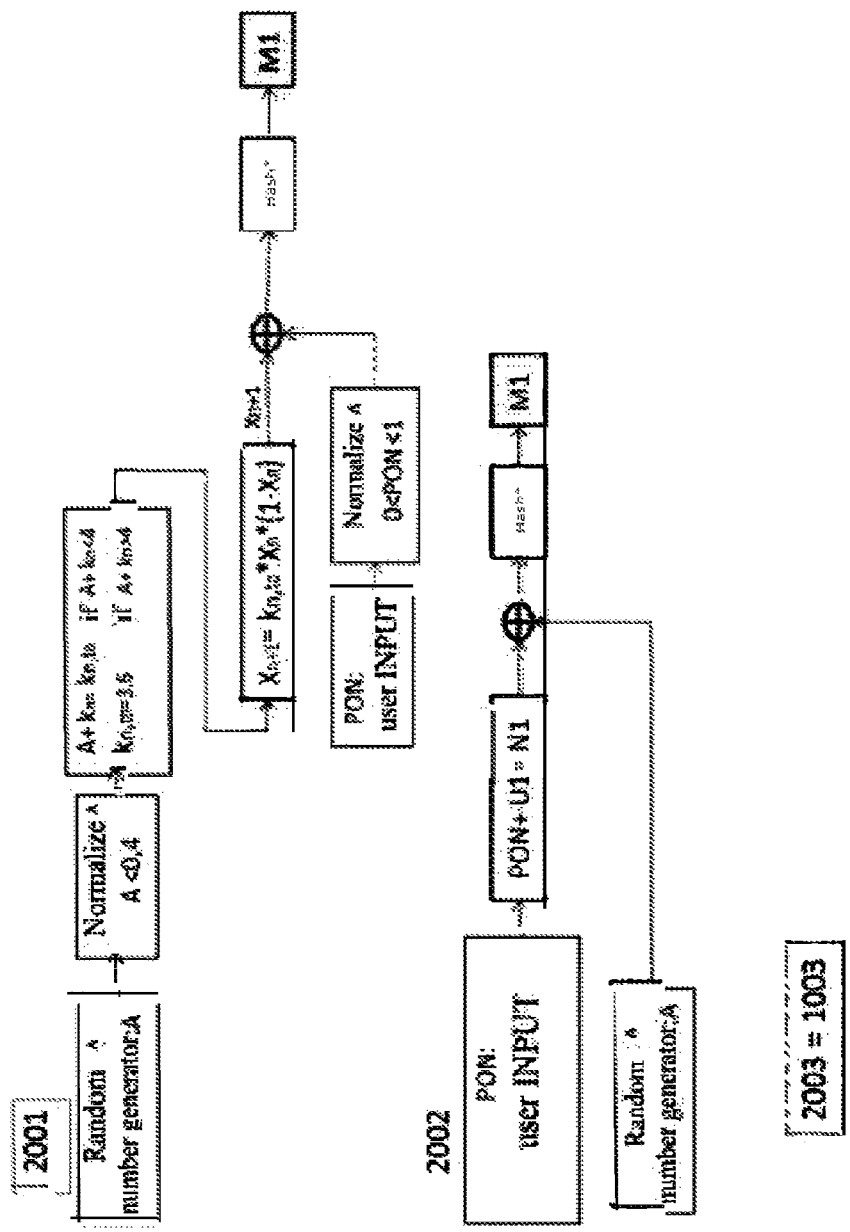
Figure 3:
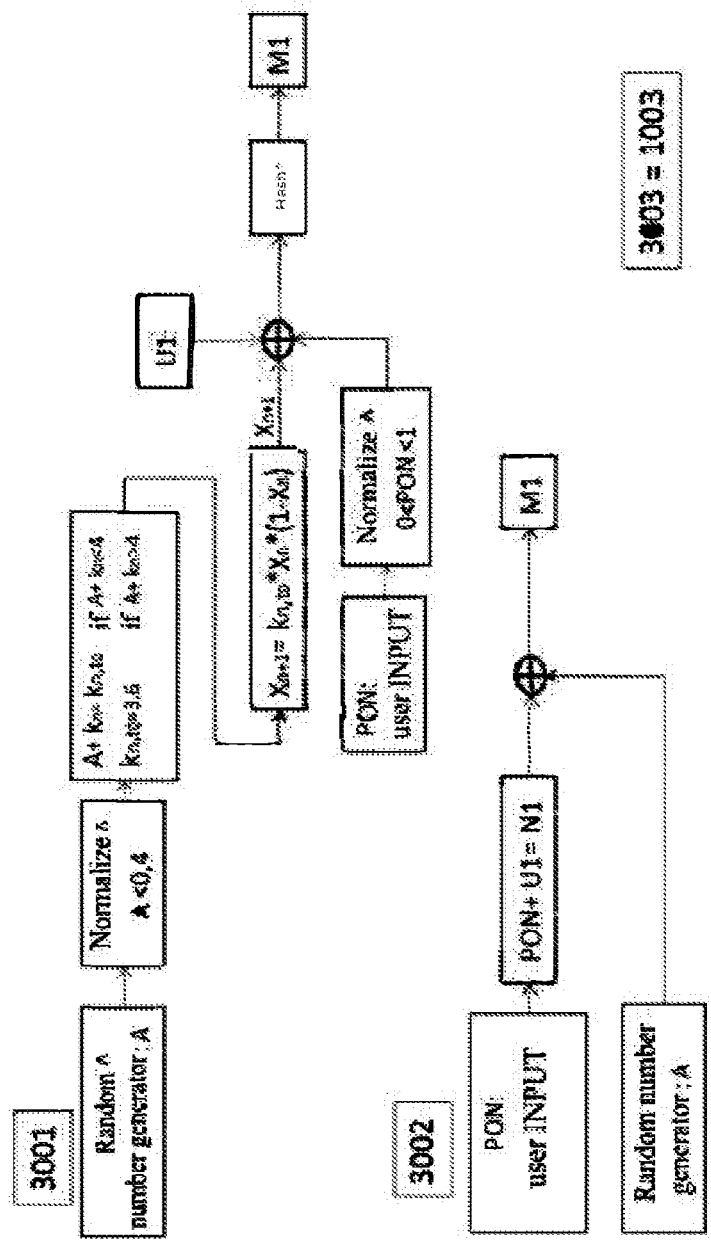
Figure 4:
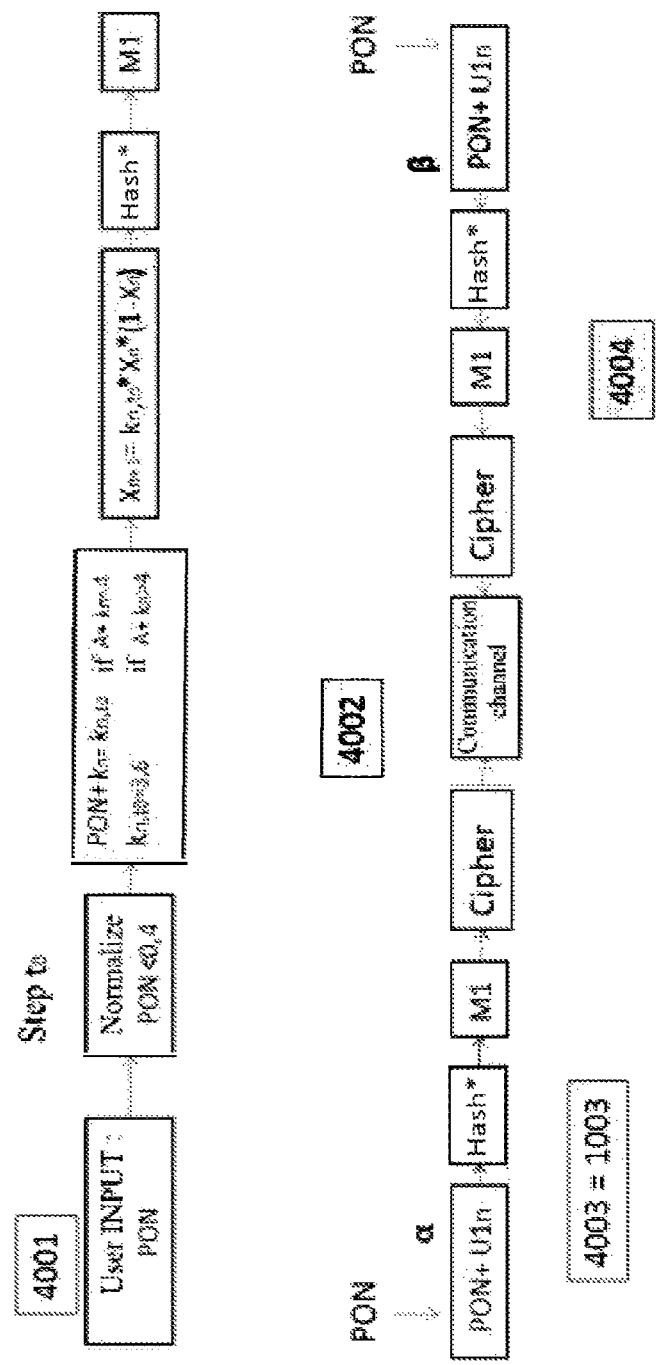

Let it suffice to say, by way of example, that SGN may be the number obtained by extracting the digits of M1 in the even positions and CSGN the number obtained from the digits of M1 in the odd positions, as in 1003 of FIG. 1 (see also FIGS. 2-4).

The following will provide a general description of the use of SGN and CSGN.

Two entities or apparatuses $\alpha$ and $\beta$ share the same algorithm for generating M1 and the same initialization for authenticating or signing a given message.

Figure 5:
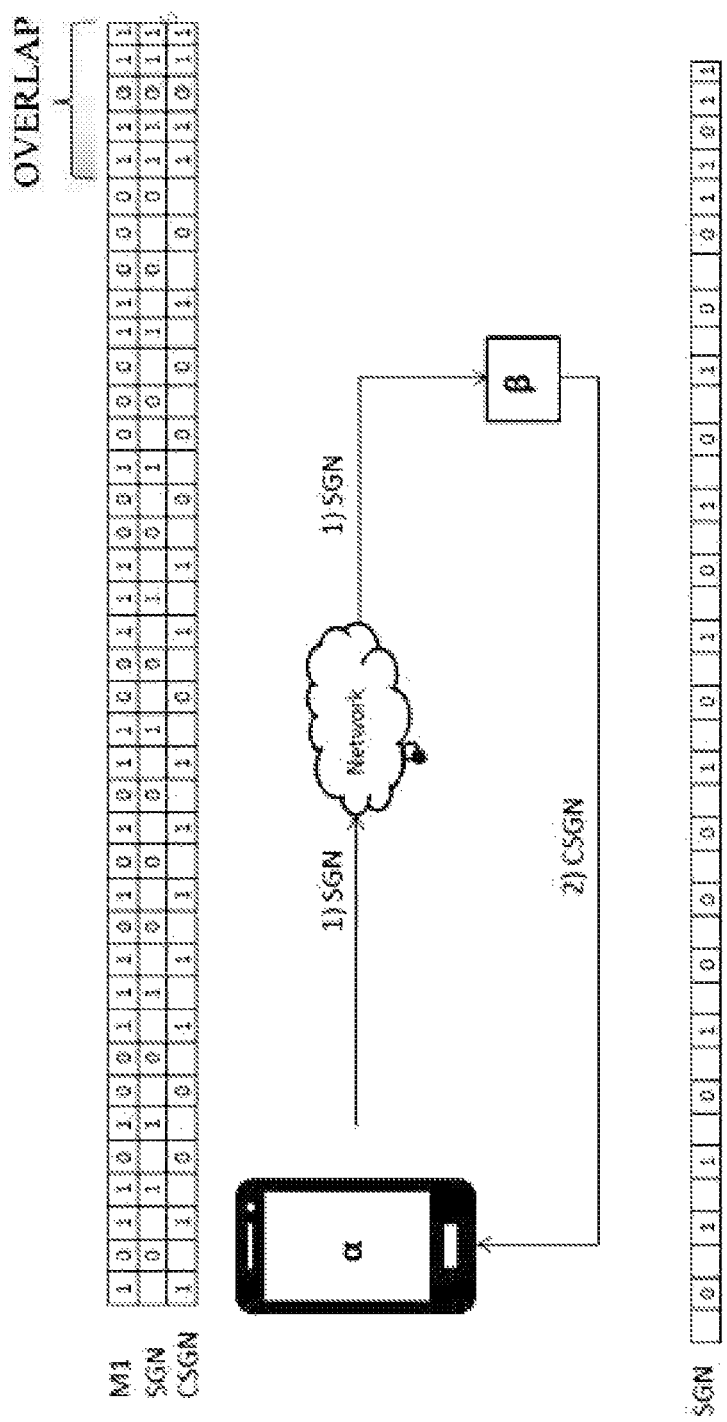

Therefore, $\alpha$ can send SGN to $\beta$ and wait for $\beta$ to reply with CSGN, as shown in FIG. 5. In order to reply with CSGN, the entity $\beta$, which has received SGN, will have to calculate one or more M1s until the received SGN matches one of the calculated ones. $\beta$ will reply by sending a CSGN corresponding to and associated with the received and calculated SGN, thus completing the authentication.

For the purpose of making false matches less probable, it is useful to introduce some overlaps between some digits of SGN equal to those of CSGN, as shown in 1003 of FIG. 1.

The number of overlapped digits between SGN and CSGN may be different: the more the overlapped digits, the less likely will a false match occur. The number of overlapped digits is a feature that can be configured by the system in such a way as to increase the overlapped digits if the system cannot handle a false match. Conversely, the system may have less overlapped digits if, when a false match occurs, the system can detect it and make a second attempt. The possibility of having two numbers with a configurable partial overlap constitutes one possible implementation of the present invention. In a primary embodiment, a few bytes constituting the checksum of the digits of SGN and CSGN are added at the beginning or at the end of the message in which SGN and CSGN are being sent. A checksum, as is known, is a sequence of bits that, being associated with the packet being transmitted, is used for verifying the integrity of a datum or a message that may undergo alterations during the transmission over a communication channel.

Every time SGN or CSGN is received, therefore, the system will, prior to checking that the received digits match those generated locally, start a checksum-based integrity check on the received data.

The option of calculating many M1s, rather than just one M1, before obtaining the correspondence, is called "proof of work". The "proof of work" is the machine time that the processor must use in order to calculate different M1s (e.g. more than one thousand) before it finds the one corresponding to the received SGN. SGN matching may occur, therefore, either with or without "proof of work", depending on the level of security required.

The "proof of work" is therefore an optional feature of the present invention, useful for increasing the level of security. An interceptor of the messages between α and β will not be able to reconstruct CSGN by reading SGN, and therefore CSGN can be used in a very general way, e.g. for:

a) validating the reception of messages, b) validating transactions of any kind, e.g. banking or payment transactions, c) authenticating an identity in communications. In this case, the interlocutor can be authenticated without requiring any mediation by a third party; therefore, if α and β want to rely on an additional mode of authentication in network communications, they can implement the system and method proposed herein.

The code M1 can be generated by a known algorithm (pseudo-random generators such as, for example Yarrow, Rule 30, Xorshift, FreeBSD, AIX, OS X, NetBSD, and the like).

In order to generate M1 it is possible to use, in addition to the above-mentioned known algorithms, a specific solution that constitutes an alternative embodiment of the present invention.

For this purpose, let us consider the logistic map equation given by: The initial values of Xn are comprised between 0 and 1. K is a positive number smaller than 4. For values of K greater than 3.6 (exactly starting from K equal to 3.56995), chaos arises: any minimal variation of the initial value of the Xn population will give different results, which is a primary characteristic of chaos.

Let us then consider a K variable from 3.6 to 4 as indicated in 1004 in FIG. 1, i.e.:

Each user (U1 . . . Un) may have a specific K:

User 1=k1, U1 with $3.6<k1<4$

User 2=k2, U2 with $3.6<k2<4$

. . .

User n=kn, Un with $3.6<kn<4$

In an alternative embodiment, K may be changed, for example, by using a pseudo-random generator such as, for example, those based on the Yarrow algorithm or the Fortuna algorithm or other algorithms, some of which have already been mentioned above. Once the pseudo-random number has been generated, which will be called A—1001—, it must be normalized to values smaller than 0.2 and greater than zero prior to be added to the previously stored K; the value may also be different from 0.2, so long as it is comprised between zero and 0.4.

Each user may, in fact, have a specific initial K—1004—different from that of the other users. The sum of A and K, as shown in FIG. 1, must be less than 4. If the value is greater, then that value will be set by convention—1001—to a value close to 3.6 as proposed herein, although this value may also be different, so long as it is comprised between 3.6 and 4. Once used, the new K is stored and will be used again for the next calculation.

Also the initial value of X may be different among the various users. Once Xn+1 has been calculated as shown in 1001, on the basis of the variable K, it is inputted to one or more cryptographic non-invertible transformation functions, e.g. hashing functions (hereafter defined as hashing function for brevity), such as Blake-256, SHA-1, SHA-2, or the like. $X_{n+1}$ is stored and will constitute $X_n$ in the next iteration. The hashing algorithm that will be used herein merely by way of example is SHA-1 or SHA-2. The output of the hashing function is M1.

In FIG. 1 one can see how to generate M1 or N1 through a specific method: Initial value of X: $0<X<1$ $Xn+1=k*Xn*(1-Xn)$ With $3.6<k<4$ Each k for each specific user may be variable; one random number A is generated at each step t. For example, for the user U2 at step 0: X1=k2,t0*Xinitial*(1−Xinitial). Considering that X1 has values comprised between 0 and 1, it is used as input to an hashing function to obtain M1 or N1. U1n is a secret number specific for the user n.

From M1, the two subsets that may have some elements in common are extracted as said SGN and CSGN, as shown in the example 1003 of FIG. 1.

In an alternative embodiment, M1 could be obtained as shown in 1002 of FIG. 1, by using one or more cryptographic non-invertible transformation functions, e.g. hashing functions, Hash*, such as, by way of non-limiting example, Blake-256, SHA-1, SHA-2, to which a random number N1 is inputted, which is originated from the sum of U1, the secret number specific for each user, and A, the random number generated by a commercial pseudo-random generator among those mentioned above. In this mode as well, SGN and CSGN are then extracted from M1.

The cryptographic hashing function known as SHA-256 produces a 32-bit output. Another typical hashing function, RIPEMD160, produces a 20-byte hash. Should M1 be required to have more than 32 bytes, the same input of SHA-256 can be inputted to a second hashing function, which in the example illustrated herein is RIPEMD160, and both outputs can then be logically concatenated or combined to form M1. Many are the methods through which M1 can be made sufficiently extended to enhance the security of the system. When M1 consists of a concatenation of multiple hashing functions, the digit overlap between SGN and CSGN must be constructed in such a way that there will be a part of the overlapped digits in each one of the outputs of the hashing functions in use.

In an alternative embodiment (see FIG. 2), a further modification is introduced for better security when generating SGN and CSGN. To this end, a code entered by the user, or anyway entered into the system, is first used. The code is arbitrary and can be modified at every transaction by inventing a new one; therefore, the user will not have to remember any secret code. This code, which will be called PON (personal obfuscation number), is combined with M1 as defined above into various alternatives that will be described below, and is used by the central payment management system and by the user's device to generate the random code M1 in an unpredictable manner.

The technique for generating random numbers is heterogeneous, and those skilled in the art will appreciate that a really random component is used, which is entered into the system by the user so as to make M1 actually unpredictable. Many are the technologic methods, available to those skilled in the art and accustomed to using different algorithms for generating random numbers, which can be adopted when using the PON in order to increase the random component of M1, thus making it completely unpredictable. By way of example, we will only mention the method that provides for the execution of a logic combination function, such as XOR or XNOR (or another logic function) between the PON and the random number A and the number U1 calculated as shown in FIG. 1 at 1002. The output of this operation becomes the input of the hashing function, also shown in FIG. 1 at 1002.

Using the PON in order to modify a parameter used for generating a random number A or the random number M1, from which SGN and CSGN are then extracted, constitutes a primary embodiment of the present invention.

In general, the PON can be used for determining a change in a parameter of any commercial algorithm used for generating random numbers. For example, the PON, suitably normalized, may cause the clock of the system used by the algorithm generating A to be incremented (or decremented) in a random manner, so that A will "jump" among the random values allowed by the algorithm. The general process according to which the PON is used, after appropriate normalization, in order to change the parameters or the configuration of any random number generator includes the following steps:

the PON is first normalized;
the normalized PON then modifies, in an unpredictable manner, one or more parameters of the random number generator;
the random number A is then outputted.

In an alternative embodiment, a system can be used for generating M1 which depends on a particular parameter, and the PON can be used for changing such parameter, possibly after normalizing the PON to the utilization values of said parameter. For example, after the PON has been normalized in such a way that it is greater than zero and has a value smaller than 0.4, it can be added to $K_n$ as indicated by way of example in 4001 in FIG. 4.

A further example of PON use is the following: the number $X_{n+1}$ in 2001 (FIG. 2), which is the output of the above-described logistic equation, can be added to the PON, possibly after the numerical value of the PON has been normalized to values between 0 and 1. The output of this sum is the input of the hashing function—2001—and such input, after having been normalized to values between 0 and 1, is stored and will represent $X_n$ in the next iteration. The output of the hashing function constitutes M1. Many are the parameters of commercial random number generators that can be modified by using the PON.

In the following, the symbol A in the drawings will indicate optional functional blocks.

The following will describe some implementation examples.

One example that may be used is the following: for each specific user, the PON, possibly suitably normalized, can be added to the last $X_{n+1}$ generated. From this sum ($X_{n+1}$+PON—2001 of FIG. 2) one obtains the input to a cryptographic hashing algorithm, such as Blake-256, SHA-1, SHA-2 or the like, the output of which is the new M1. The result of the sum $X_{n+1}$+PON—normalized between 0 and 1—is stored and will constitute $X_n$ in the next iteration.

Another example that may be used is the following: for each specific user, the PON can be added to a secret number specific for the user U1. From the sum U1+PON—2002 of FIG. 2—(or A+PON+U1—2002 of FIG. 2—), one obtains the input to a cryptographic hashing algorithm, such as Blake-256, SHA-1, SHA-2 or the like, the output of which is M1.

There are also other combinations, such as $X_{n+1}$+PON+U1—3001 of FIG. 3—from which one can obtain the input to a cryptographic hashing algorithm, the output of which is still M1. The output of the sum $X_{n+1}$+PON+U1 is normalized to a value between 0 and 1 and then stored, so as to constitute $X_n$ in the next iteration.

Should the security requirements be less restrictive, it is conceivable to not use a cryptographic hashing algorithm like Blake-256, SHA-1, SHA-2 or the like, and to use directly the output of the sum A+PON+U1 as described in 3002 of FIG. 3.

In general, the hashing function can be eliminated also from 3001 (FIG. 3) and from 2001 (FIG. 2). Also in these cases (and in these embodiments), CSGN is a subset of M1 and may have some digits overlapping those of SGN, which is the other subset of M1.

With the introduction of the PON, CSGN and SGN are made even more unpredictable and some sort of transaction signature is created: CSGN and/or SGN represent the signature of the service provider as a guarantee for the vendor and/or the supplier of a service. The correspondence of CSGN warrants that the message has been sent from the only subject that could generate the same M1 starting from the PON.

There are many possible PON scenarios and applications. Before describing some application examples, the following will describe the methodology, while any further contents that may be entered into the messages will be examined later on.

Figure 8:
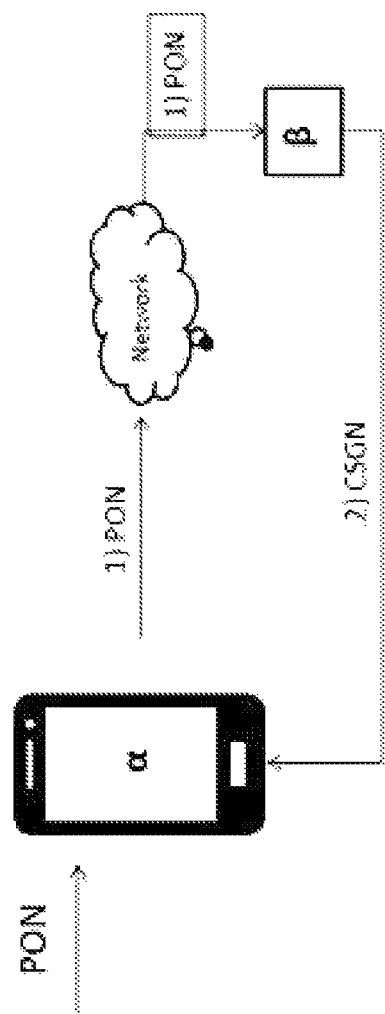

In FIG. 8 it can be seen that, after the user a has entered the PON, the APIs of the user apparatus generate M1, SGN and CSGN. The PON is sent to the entity β, which, based on the initial conditions and the profile of the user who has sent the PON, calculates M1, SGN and CSGN. The entity β sends CSGN to α, certifying its identity or certifying a given operation. If on the contrary it is the user a that has to be authenticated, then the messages will be exchanged in a different manner: the PON entered by the user α is sent to β, which calculates M1 and SGN. β sends SGN to α, which, on the basis of the PON, calculates the M1 corresponding to the received SGN. α sends CSGN to β to confirm the user's identity.

Let us consider, for example, the following application of the PON, and let us see how, at a place of business, whether physical or on-line, it can be used in order to ensure that the payment has actually been made.

Figure 15:
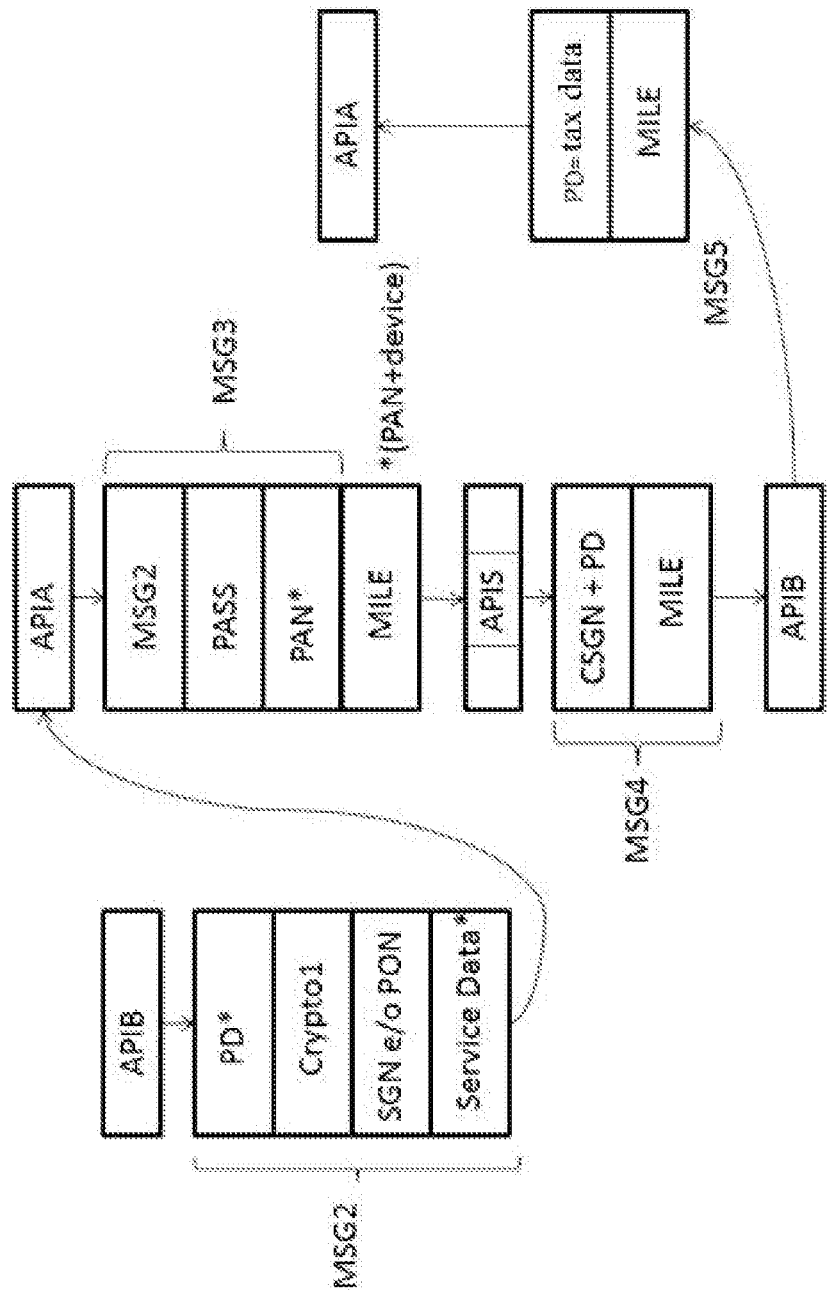

For this purpose, at a generic place of business the vendor enters (along with other information concerning the payment transaction, as described in FIG. 15 and/or in FIG. 16—MSG2), the PON code into his own user apparatus, and therefore into APIB. It is not necessary that the PON is seen by the payer A.

To exemplify, the PON entered by the vendor at the origin of the payment transaction may be included into a visual QR code encoded together with the other information required for starting the payment transaction, such as, for example, the amount to be paid, the vendor's identification data and the data of the purchased product. Such data are described in FIG. 15 and FIG. 16 and are contained in the message MSG2. The datum Crypto 1 of the message MSG2, and the use thereof, will be described later on. The information that may be included in the Service Data of MSG2—FIG. 15 and FIG. 16—are the invoicing tax data of user B and/or the data of a fidelity card program that may be active at the point of sale of B and/or the data concerning the number of the cash desk where the transaction is being made. The integration of such information with the payment data constitutes a characteristic element of the present invention.

Actually, the PON may be received in many ways alternative to the visual QR code.

In fact, the communication channel used for sending the PON to the payment device being used by the payer may be a simple message over IP (Internet Protocol) travelling over a WiFi network or a 3G, 4G or 5G mobile network, or via Bluetooth or the Internet or RFID, or by any other means, such as SMS or messages over chatterbots or other messaging systems, e.g. Whatsapp, Messenger, Telegram, Wechat or the like, to mention just a few.

The PON received by the payer A is sent from the same payer to the central transaction processing system without undergoing any modification by the payer, who has no access to such datum. User A will have to enter a PIN to validate the payment transaction and/or to enter his fingerprint or another biometric characteristic of his. Such activities, carried out by A, will be further described hereafter.

The field containing the PON may, in an alternative embodiment, be encrypted by APIB. For this reason, in a further alternative embodiment, the vendor may send the PON directly to APIS—FIG. 16 Msg.11: central payment transaction processing system. On the vendor's payment device, once the PON has been entered, the APIB s of the device calculate M1. The same M1 is calculated by APIS on the basis of the received PON and on the basis of the vendor's identifier (ID). The payment transaction request sent to APIS from the payer is carried out by APIS on the basis of the previously recorded payer's data.

The necessary payer's data are, for example, the payment card or debit card number, the card PIN (personal identification number) and the card expiry date, the card security number or just the bank account number (or IBAN—International Bank Account Number—as preferentially indicated hereinafter) and the authorization data for making bank transfers from that specific IBAN. Based on the payer's data, APIS will request a payment transaction, e.g. a bank transfer, in favour of the vendor, the data of which it has received in the message sent by the payer: msg3 in FIG. 15. The data of the vendor receiving the payment may be his IBAN and/or the number of a rechargeable card or the like. In order to make the payment, APIS will use the normal interbank standards.

The central payment system will make the payment (e.g. by using the EMV standard or also normal bank transfers) by interfacing to the interbank system via standard procedures and protocols. The above-mentioned EMV standard stands for Europay, MasterCard and Visa, i.e. the three companies that originated the technical standard used for payments via smart card on POS apparatuses and for ATM cash withdrawals.

In practice, APIS will use the web-based payment procedures made available by the bank of the customer for making bank transfers. As an alternative, APIS will use, for example, the EMV standard to request: i) a payment to be charged to a given payment card of the user A in this case, as if it were a POS, or ii) a cash withdrawal from a virtual ATM to be charged on a given payment card. The money virtually withdrawn will be used for a payment of an equal amount that will be made, for example, via bank transfer to the IBAN of the vendor B.

When the transaction started by the payer is being carried out by APIS, the same APIS will send CSGN to the vendor. If CSGN received by the vendor matches the CSGN extracted from M1 locally generated on the system of the vendor B, then the transaction will be completed and certified for the vendor, who will have received a confirmation that only APIS could have generated for that specific vendor on the basis of the PON entered by the same. Once the payment has been successfully completed, the event will also be notified to the payer through a message MSG5, as shown in FIG. 15 and FIG. 16.

The PON can also be used among three different entities, two of which, δ and β, while they are secure parties, play different roles and have different responsibilities. Let us consider, for example, FIG. 9, wherein, upon an input from user α, based on such input δ generates a PON (or modifies the PON received from α) and sends it to β and to α. The PON sent to α will be encrypted or unavailable to α until the latter receives a message from β with the key for reading that PON. After having received the PON, β will generate many M1s, and from the last M1 selected will extract SGN and CSGN. β will send SGN to α (in addition to the keys for reading the PON) and CSGN to δ. Based on the PON now available, α will generate many M1 s until it finds the one corresponding to the SGN received from β. It will then send the corresponding CSGN to δ. If CSGN received from α is equal to that received from β over a secure communication channel, then δ will be able to supply a service to α because the latter will be authorized.

Figure 9:
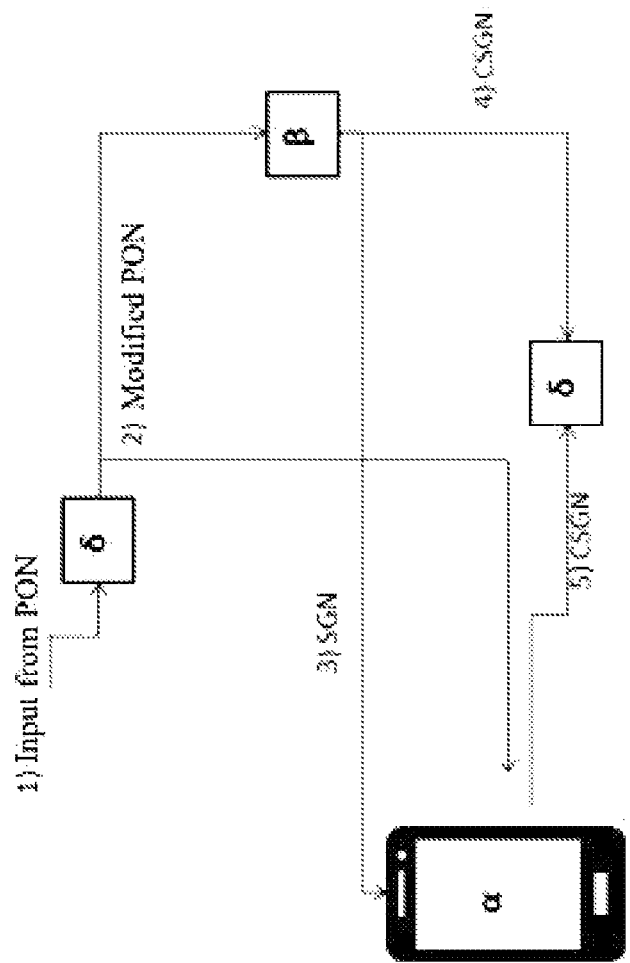
Figure 10:
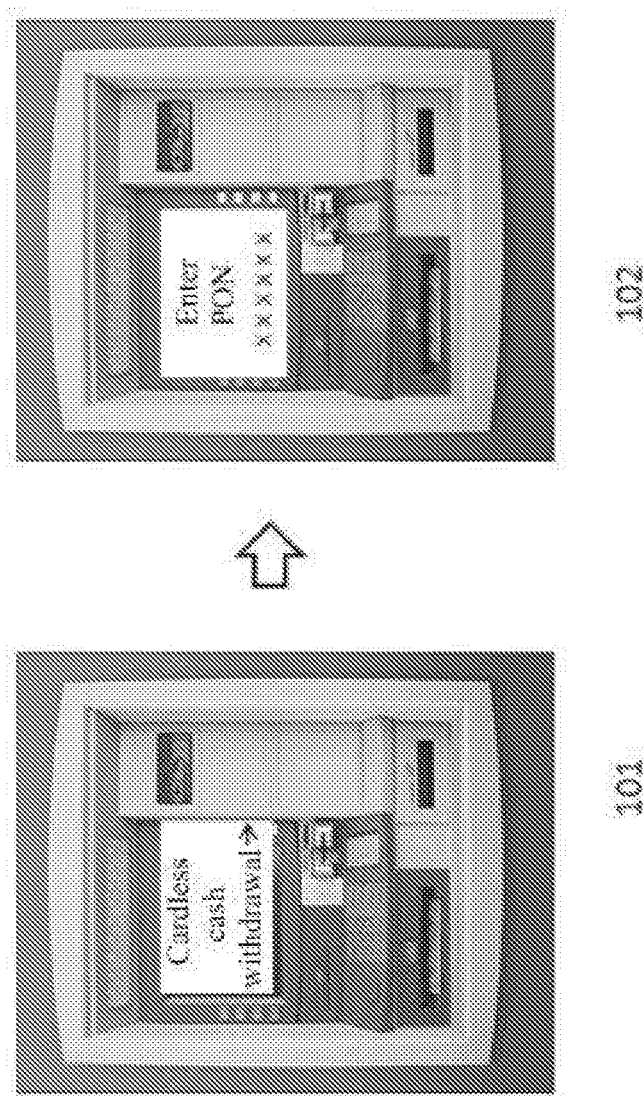
FIGS. 10 to 13 show some variants of application of said sequences of steps on banking terminals.

The diagram showing the use of the PON, represented in FIG. 9, may find an embodiment at a cash machine or ATM (hereafter these two terms will be used without distinction). The ATM system should be made to include, through a modification to the system software, an option for cash withdrawal in cardless mode—FIG. 10—101. (FIG. 10: 1 step—ATM scenario) According to this option, the ATM software system sends to the withdrawer, through the ATM display, a request for entering the PON—102. Once the PON has been entered, the ATM system 202 will generate locally a QR code. The QR code will also include, in addition to the coordinates identifying the ATM, the PON just entered and partially modified by the ATM software. This PON that has been modified from the one entered by the user will be hereafter always referred to as PON and will not be subject to any further modification.

The PON may be modified in many ways, since it is not necessary to change all the digits, but only a part thereof, which will be replaced with random numbers generated ad hoc by the ATM software. The withdrawer captures the QR code, e.g. by means of a smartphone or the like. In this case as well, it is useful to clarify that the data contained in the QR code could be received by the withdrawer in many alternative ways, e.g. via RFID, Bluetooth, WiFi, 3G, 4G, 5G connection, or the like.

Through dedicated software (e.g. a chatbot or a smartphone application, or messaging systems like those already mentioned), the withdrawer will send such data to APIS. In this case, we will call APIB all the APIs being used by the withdrawer's terminal. APIB will store the PON captured or received from the ATM. This PON stored by APIB may also be encrypted, e.g. with a symmetrical key specific for that ATM and unavailable to the user B. APIS must identify the user B and then generate a code M1 on the basis of the received PON.

Figure 11:
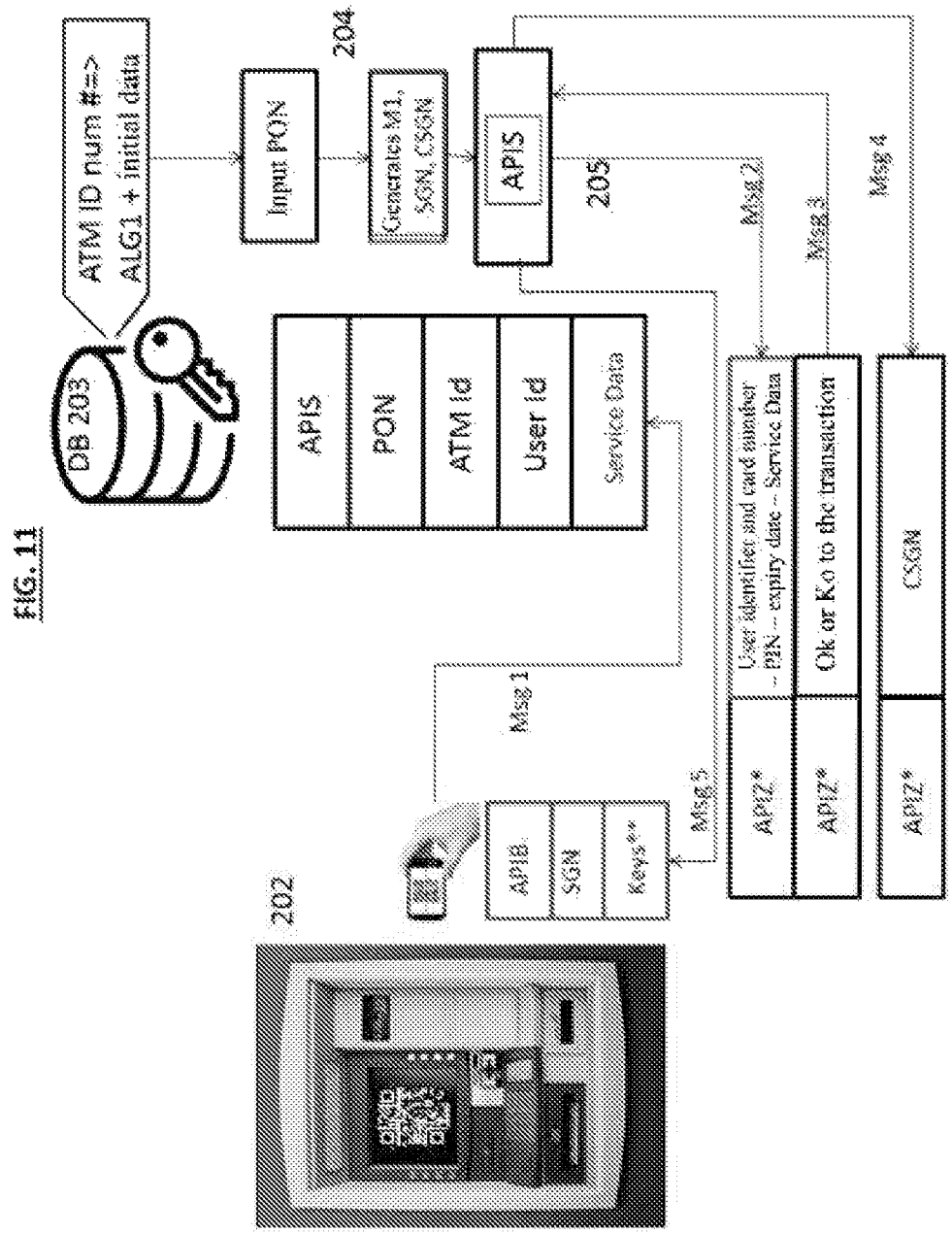

In order to identify the user, APIS must have received the credentials of that user in an authenticated message, e.g. Msg 1 of FIG. 11 (FIG. 11: 2 step: ATM scenario). Such message will thus also include, in addition to the PON and the univocal ATM identifier—ATM ID—, the data of the user B contained in the User ID field; this field is meant to include, also when used again afterwards, at least a user identification number with at least one encoded biometric datum and one or more numbers identifying the terminal of the same user.

Figure 13:
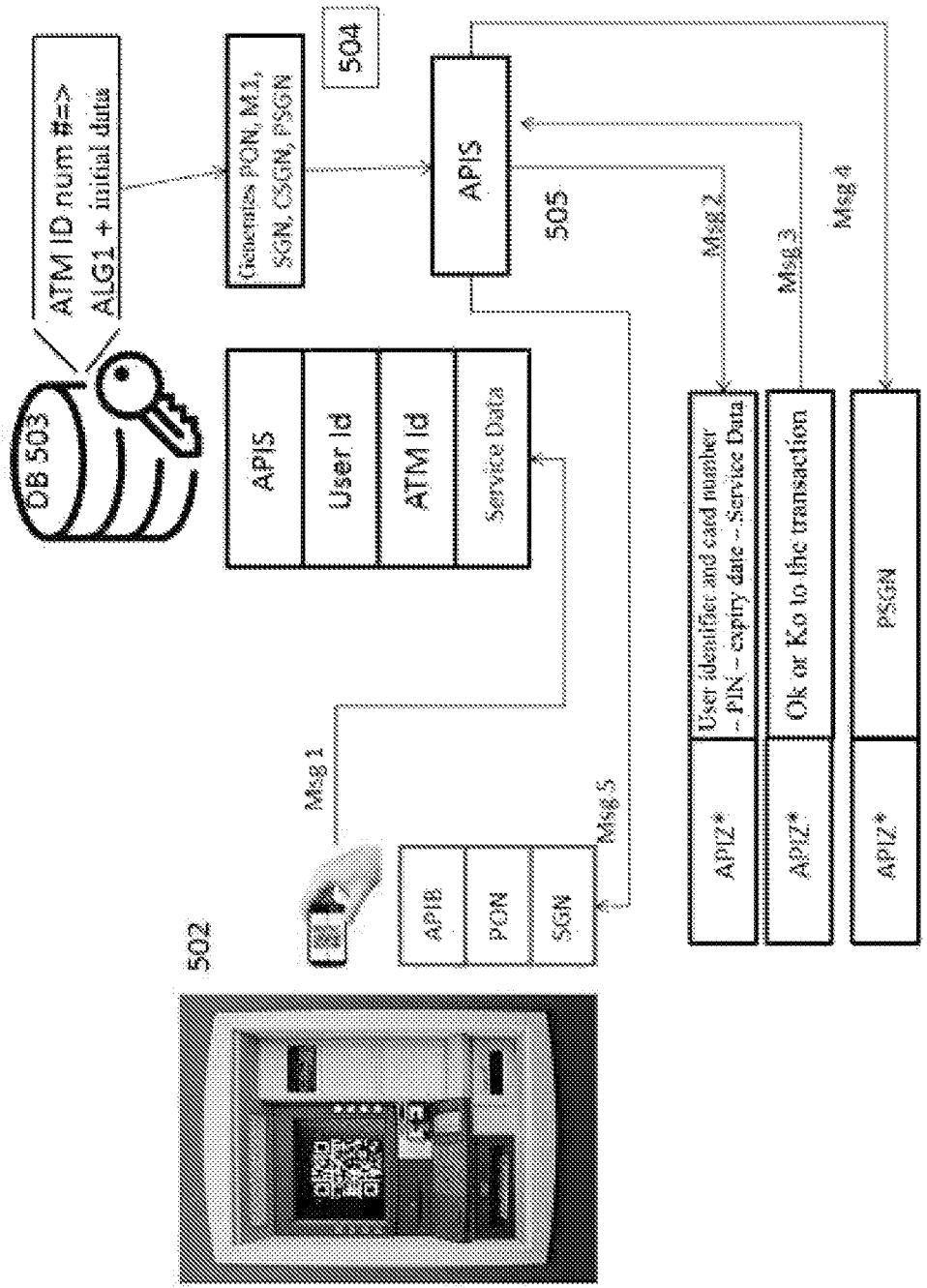

The Service Data field—msg1 of FIG. 11 and FIG. 13—may include data such as the time stamp (date and time) and other service information: for example, it may be indicated whether the PON is encrypted or not. In one embodiment, the Service Data may also contain the amount to be withdrawn, entered by the user upon request from the ATM. In order to be able to generate a suitable M1 on the basis of the received PON, APIS must interrogate a database—BD 203—wherein a specific algorithm for calculating M1, e.g. ALG1, corresponds to each identification number of the single user B, and which includes the initial system data updated to the last M1 calculation for that specific user.

One or more codes M1 will then be calculated (proof of work)—204—on the basis of the PON and of the M1 calculation algorithm, which may be specific for the identified user B. If the PON has been encrypted, the database—BD 203—will have the key, specific for that ATM where withdrawal is taking place, for decrypting the PON. The database—BD 203—may be located in different environments.

APIS may receive the new M1 from the database—BD 203—or, in an alternative embodiment, it may calculate it autonomously after having received from the database—BD 203—the data necessary for making this calculation. After having calculated (or received) M1, APIS will send to the identified ATM or to APIZ of the bank controlling the ATM the withdrawal request—205—in Msg2, see FIG. 11. The withdrawal authorization request sent from APIS to APIZ will include the data of the withdrawer's account, such as ATM card number and personal identification number—PIN—, expiry date of the payment card and other information (service data in Msg 2 of FIG. 11), i.e. all the data that were entered by the withdrawer when he subscribed to the payment and withdrawal service of the present invention, necessary for obtaining the authorization from APIZ. The Service Data will allow making the withdrawal request in compliance with the evolutions of regulations and standards like EMV, and therefore the message Msg 2 of FIG. 11 will transport such additional data in a transparent manner in the Service Data field, so as to be able to follow the evolutions of the EMV standard (or other procedure).

According to one implementation option, the Service Data may contain the amount to be withdrawn. For example, Msg 2 of FIG. 11 will include in the Service Data further information relating to the authentication of the withdrawer, as is typical of the interbank protocol. If APIZ confirms and authorizes the withdrawal, then it will send Msg 3 of FIG. 11 to APIS. APIS will use M1 received from the database—DB 203—(or calculated) in order to extract SGN and CSGN from it. SGN will be sent to the withdrawer's device APIB through Msg 5 of FIG. 11.

In one implementation option of the present invention, in addition to SGN also the key for decrypting the PON stored by APIB and a pointer to the ALG1 algorithm used for calculating SGN will be sent: this information will be contained in the Keys field of Msg5 of FIG. 11. CSGN will be sent to APIZ through Msg 4 of FIG. 11.

After having decrypted, if necessary, the PON previously stored, and after having received SGN, i.e. the "challenge", APIB will start generating, by using the ALG1 algorithm, many M1s until it finds the one corresponding to the SGN just received, and hence also CSGN. CSGN extracted from the calculated M1 will be the security code, generally corresponding to the so-called banking PIN.

Figure 12:
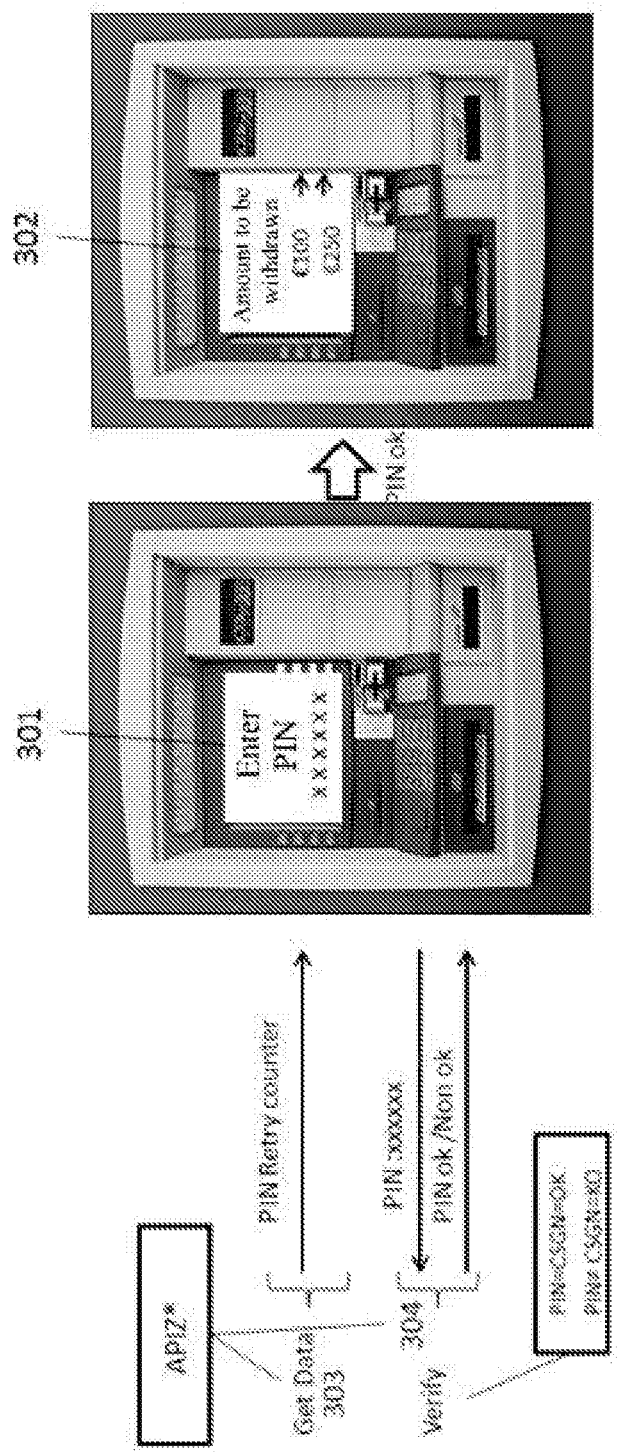

The withdrawer B will be requested—301 FIG. 12—(FIG. 12: 3 step—ATM scenario) to enter an authorization code typically called PIN: as aforesaid, this code is, in this case, equal to the number CSGN, or a part thereof; in general, the authorization code CSGN to be entered will be longer than the five digits typically used for the banking PIN.

Therefore, the user B will enter the code CSGN calculated by his own device into the ATM where he is making the withdrawal. The ATM will communicate with APIZ through the normal interbank procedures, so as to pass the code CSGN over to APIZ. For example, the code CSGN, or a part thereof, may be sent to APIZ, in compliance with the EMV procedure called Verify, by entering it into the PIN field or an appropriately extended equivalent thereof. The code CSGN entered into the ATM certifies that the user making the withdrawal is the same for which the transaction has been requested. The procedure followed by the ATM may follow as much as possible the Get data 303 and Verify 304 procedures of the EMV standard. If the code CSGN entered by the withdrawer matches the one received by the ATM (or, as an alternative, locally calculated by the ATM software), then the withdrawal will be effected successfully.

In an alternative embodiment, the withdrawer B is subsequently requested, through the message 302 displayed on the ATM (video prompt) to enter the amount that he wishes to withdraw. In an alternative embodiment, the APIZ functions may reside in the ATM where the withdrawal is taking place.

In general, the operations described herein may be modified in different alternative embodiments: for example, as aforesaid, the amount to be withdrawn may be entered by the withdrawer when the PON is requested; in this embodiment, the QR code carries in the Service Data of Msg 1 of FIG. 11, in addition to the PON and the ATM identification code, also the amount to be withdrawn. In this embodiment, the withdrawer will only be requested—301—to enter the CGSN code into the ATM, and the withdrawal authorization will only be dependent on the correctness of the CGSN.

Numerous alternative embodiments may be implemented by modifying the position of the database and some message exchanges.

For example, M1 may be generated locally by the ATM. In such a case, the ATM will request the cash delivery authorization to APIZ and/or APIS only after having compared the CSGN code entered by the withdrawer with the one generated locally. By using the technique described herein, the withdrawer has been able to withdraw cash without having a credit or debit card and without an account number or PIN. He simply selected the cardless mode option at the ATM, entered a random number (the PON) and, upon receiving the CSGN on his smartphone from his service operator, entered it through the ATM keyboard as a substitute for the PIN. The ATM has no additional hardware, since it only uses a new software functionality and/or a modified communication protocol.

An interesting alternative embodiment makes use of SGN and CSGN without asking the user to enter the PON, as shown in FIG. 13 (FIG. 13: "no PON" ATM scenario). The difference from the preceding embodiment lies in the fact that the user does not enter the PON, and therefore sends, in msg.1 of FIG. 13, only the data relating to his own identity, i.e. the user ID including at least one biometric datum of the user B. The other data of msg.1 of FIG. 13 are the ATM identifier, i.e. ATM ID, and the Service Data field, which may include data such as the time stamp (date and time) and other service information, such as the amount to be withdrawn. Based on the user data, APIZ will be requested to authorize the withdrawal; msg.2 of FIG. 13 equals what was implemented in the PON scenario. Msg.3 of FIG. 13 contains either the authorization or the rejection of the transaction by APIZ, as in the PON case.

Based on the identified ATM, the identity of B and the initial configuration data, APIS generates —504 FIG. 13—a PON and, based on the latter, different M1s until it selects an SGN and a CSGN. If the transaction is authorized, then APIS will send SGN and the PON from which it was generated to APIB—msg.5 FIG. 13. APIB will calculate the CSGN corresponding to the received PON and SGN, and will return to the user a number that will be called PSGN, composed of the received PON and CSGN, or a part thereof. Such PSGN can be constructed in many ways; let it suffice to say, by way of example, that it may consist of the first 5-6 digits of CSGN, with the addition of the digits of the PON as the most significant digits. APIS will have calculated the same PSGN and sent it to APIZ in msg.4 of FIG. 13.

The PSGN number thus obtained will be the security code for authorizing the withdrawal at the ATM.

The withdrawer B is requested—601—to enter a withdrawal authorization code, which in this case is equal to the PSGN number (or a part thereof) and, typically, such authorization code will be much longer than the five digits typically used for the banking PIN. User B will enter the PSGN code, calculated by APIB in his own device, into the ATM where he is making the withdrawal.

The ATM will communicate with APIZ to pass the PSGN code over to APIZ in order to verify the correctness thereof.

The PSGN code or a part thereof could be sent to APIZ by following, for example, the normal EMV procedures, so as to enter PSGN into the PIN field or an extended equivalent thereof with a greater number of digits. The PSGN code entered into the ATM will certify that the withdrawing user is the same as the one for which the transaction has been requested. The procedure followed by the ATM may be, as much as possible, similar to the Get data—603—and Verify—604—procedures of the EMV standard. If the PSGN code entered by the withdrawer matches the one of APIZ (or, as an alternative, calculated locally by the ATM software), then the withdrawal will be effected successfully.

In one alternative embodiment of the "no PON" scenario, APIS will send the CSGN, instead of the PSGN code, in Msg4 of FIG. 13, and APIB, after having calculated the CSGN corresponding to the received PON and SGN, will communicate CSGN to the user B as an authorization code instead of the PSGN code. The present embodiment differs from the preceding one only for the use of CSGN in the place of PSGN.

By using the technique described herein, the withdrawer has been able to withdraw cash without having a credit or debit card and without having an account number or banking PIN (except the one to be keyed in on his device). In this no-PON option, the withdrawer has not entered anything but the amount to be withdrawn and the PSGN code received and used for certifying the withdrawal. The modes of use of the present invention with or without PON are manifold, and only two have been described herein merely by way of example. This is, therefore, a general mode of signing an operation, which adds to the current techniques or even replaces them, if allowed by security requirements.

The advantage over current electronic signature systems is that it requires less processing capacity. When used as an input to a system for generating encryption keys, the PON may also be used for generating new encryption keys for two systems that must communicate in encrypted mode. The PON transmission channel must be, in this case, a secure channel. M1 or concatenations of M1s, generated as shown in 1001, 1002, 2001, 2002, 3001, 4001, may constitute the symmetrical encryption key between two systems α and β exchanging the PON over a secure communication channel. 4002 shows an example of two encryption systems called "Cipher" utilizing M1 or multiple M1 numbers as encryption keys.

As already described, the present invention concerns a system and a method which use a series of high-security procedures (or algorithms) for electronic payments that can be effected through portable or fixed devices, such as smartphones, smart cards, personal computers and the like. The user who is using such a system, whether A as a payer or B as a creditor, once registered into the service, can use a browser or a software application or a chatbot on a mobile or fixed terminal, a smart card, or the like, which will allow making and/or receiving payments by implementing APIA and/or APIB. The mobile or fixed terminal may be a Personal Computer, a smartphone, a tablet or the like. The system allows, therefore, both the payer and the creditor—or vendor—to use the same user apparatuses and a software application that may include the APIA and APIB functionalities.

In practice, APIB and APIA, while they perform different functions, may nevertheless utilize the same user apparatus. Hereafter APIA and APIB will be differentiated only for the purpose of clarifying which functionalities are specifically implemented by APIA and APIB. As regards APIS, these functionalities can typically run on a software stack separate from APIA and APIB, but in some cases nothing prevents APIS from coexisting with APIA and/or APIB.

When A and/or B subscribe to the service, in order to enable the system for making payments to or receiving payments from third parties the user will have to send data such as his bank account number, optionally more than one bank account number, and the associated holder data. By way of example, the user may send his personal IBAN (International Bank Account Number), the one of his business, etc.

The holder data of the corresponding bank account will be associated with each IBAN; optionally, the personal and/or business tax code of the account holder and the numbers of the fidelity cards used by the user may be associated with such banking data. In order to make payments through payment circuits, such as, for example, those used by debit cards, prepaid cards and/or credit cards, or through a payment circuit compliant with the EMV standard, the user will have to send, while subscribing to the service, some specific information about his payment card, such as the payment card number, the expiry date, the PIN, the card security number and the payment card holder name. In order to transfer such data of his own payment cards to APIS, the user must use a secure connection and must in turn be authenticated. Once authenticated by APIS, he will have to send said data of his own payment card over a secure connection, e.g. https, in order to be then able to make payments through the most important payment card circuits, such as, for example, Visa, Mastercard, Cirrus, Maestro, Visa Electron, Bancomat, PagoBancomat, American Express, V Pay, Plus, etc.

The APISs that receive such data will store them and will also translate the IBAN (and/or the payment card number) and the holder data of that IBAN and/or of the payment cards (and optionally the holders' tax code or vat number) into a numerical datum.

The technology employed for translating such data into a univocal numerical datum is a cryptographic hashing function such as, for example, SHA-256, Blake-256, HEFTY1 o the like, or combinations of such functions. Optionally, the simple hashing data may be complemented, by the APIS system receiving the message from the user, with a "proof of work" variable from time to time. The "proof of work" consists of the hashing datum plus an additional processing effort from the APIS system. In this case the APISs, in addition to encoding the received fields by applying the selected hashing function or combination of hashing functions, may also generate a univocal datum with certain characteristics, which requires some processing effort from the processor: by way of example, to the IBAN number and the holder data (name, surname, tax code . . . ) a number is added at the end, which is then incremented (IBAN+data+ 01, MAN+data+02, IBAN+data+03); then the hashing functions are applied to each data block and the associated increment until an output is determined which begins, for example, with three digits 1 in cascade (e.g. 1110d98b388e77eec46660de9c6f042ac67134cbb497ce).

The APIS system must therefore apply the hashing functions until it finds the output that begins with three digits 1.

Generalizing the above concept, the APIS system is able to generate, at each banking transaction, a new user identity as a combination of the first and/or second parts (SGN, CSGN) of the number M1, and/or of the random code (PON), with clear and/or confidential data of the user's identity, and to iteratively apply to this combination a non-invertible transformation function (e.g. Hashing function) at every banking transaction, connected to the preceding transaction.

The APIS system could periodically update such cryptogram or, at any rate, use different proofs of work for different users: instead of beginning with three digits of number 1, it may begin with four digits of number 0. The APISs for generating such an improbable cryptogram beginning must spend resources of the processor, which will have to reiterate the operations until it finds the output with the cryptogram beginning (or end) required as a proof of work.

All this hinders many frauds and allows some ongoing verifications, and, most importantly, the user's identity is univocal. From this point of view, it is useful to employ the proof of work generated for identifying the payment card of the user A with the associated data (expiry date, holder name, device identification number, etc.) or anyway the holder's data useful for accessing the remote payment function by using, for example, web procedures granting access to the payment account. The set of such data will hereafter be referred to as PAN (Personal account number).

Figure 6:
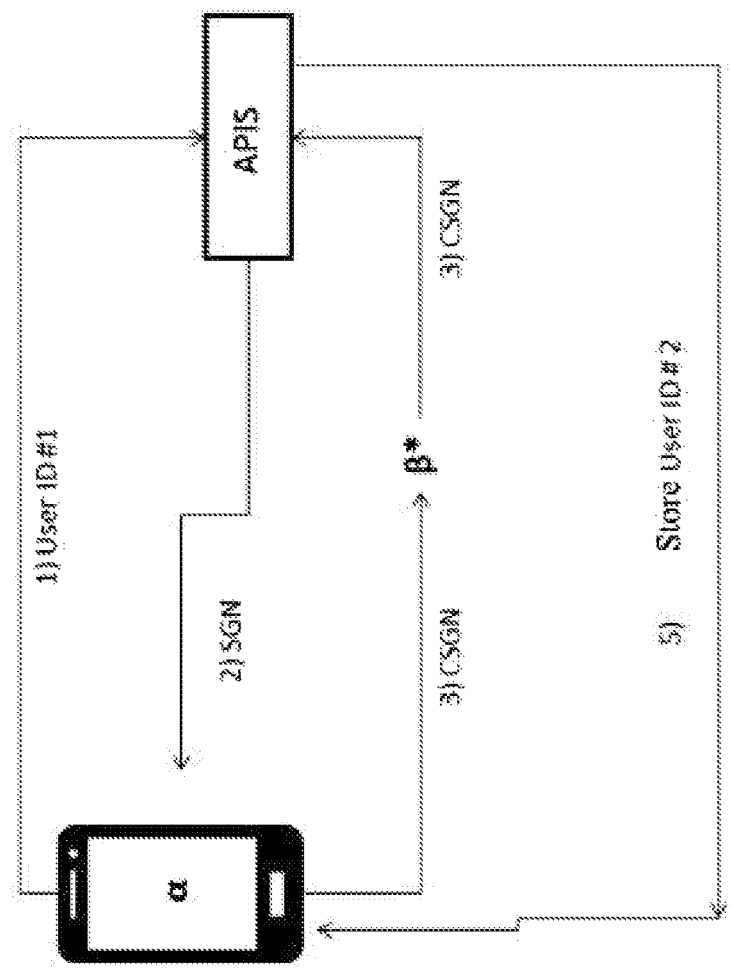

A procedure, illustrated in FIG. 6, allows changing the data of the PAN field and those of the User Id field (see FIG. 15 and FIG. 16) at each transaction. The procedure recalculates the PAN or the User Id (or the like) by using the data of the last transaction (e.g. the last calculated CSGN), so as to make it variable and anyway non-modifiable.

In the example shown in FIG. 6, the new User Id, which will be called User ID #2, is equal to the output of an hashing function having as input the old User ID combined with (e.g. added to) the last used CSGN and a number $U_n$, which may be specific for each user. The same procedure described for the User Id can be repeated for each user identification datum (e.g. the PAN). Also in the procedure of FIG. 6, if one wants to generate some sort of proof of work, it is possible to apply the hashing function repeatedly: for example, to the data block User ID #1+CSGN+$U_n$+01, then to the block User ID #1+CSGN+$U_n$+02 . . . User ID #1+CSGN+$U_n$+$I_n$, and continuing in this way until the increment $I_n$ produces the desired proof of work. The newly calculated User Id #2 will then be sent to the user's device, where it will be stored in the place of the previous User Id (Used ID #1 in our example). $U_n$ is a user-specific secret number and is optional. Without $U_n$ the data block will become: User ID #1+CSGN+ 01, User ID #1+CSGN+02 . . . User ID #1+CSGN+$I_n$. Once the required "proof of work" has been found, the new User Id will be obtained, which will be called User ID #2. The newly calculated User Id #2 will be sent to the user's device, where it will be stored in the place of the previous User Id (User ID #1 in our example).

The advantage of the procedure of FIG. 6 is not only related to the improved security of a User Id not changing at every transaction, but also to the fact that it makes it difficult to cancel operations carried out by a given User Id.

Figure 7:
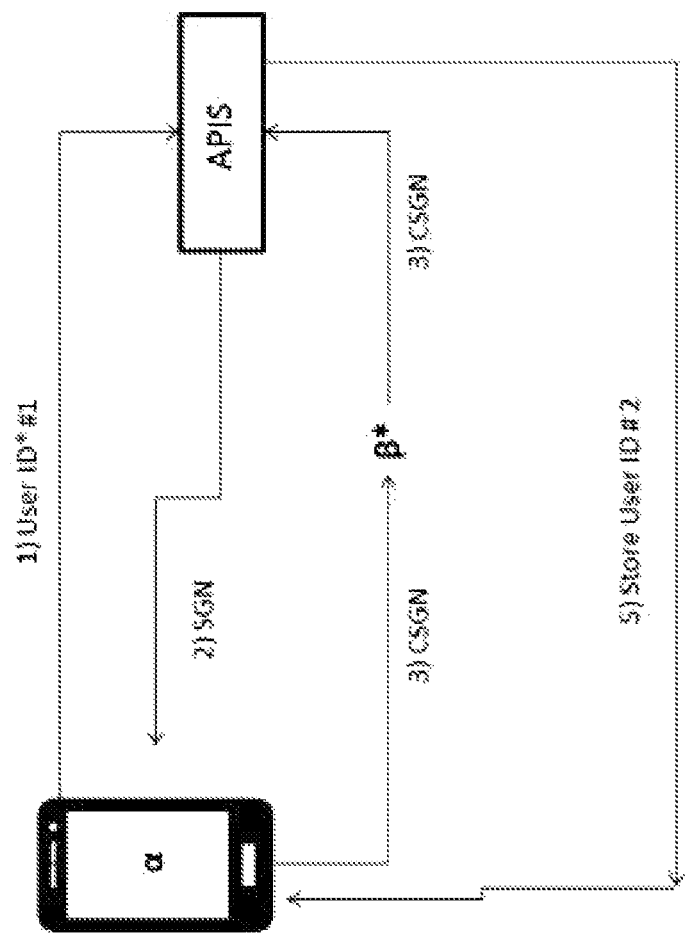

FIG. 7 illustrates a variant wherein the stored userID #1 is modified before being used. In the example of FIG. 7, the stored userID #2 is modified before use as follows: some user's personal data are added to userID #2, including biometric data and/or PINs stored and shared with the system, and possibly other shared data may also be added (i.e. device numbers). To all these data added (e.g. summed) to userID #2 an hashing function is applied, and the modified userID* #2 is obtained. The APIS system of FIG. 7 expects to receive a userID* #2 modified from the one sent, as a confirmation of the fact that the user knows the PIN and has a given biometric characteristic (e.g. fingerprint).

A proof of work can be implemented also in the case described in FIG. 7, as in the case described in FIG. 6.

The proof of work described in the various cases also allows for easy intermediate verifications of the veracity of the subject that will receive the payment, e.g. by verifying if the data begin with three ones or four zeroes. In most cases, a cryptogram may simply be generated without proof of work.

Figure 14:
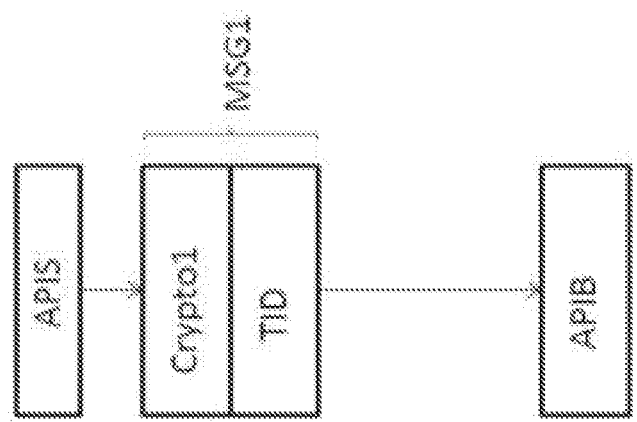

The cryptogram, which will be referred to as Crypto1 when concerning the data of B, and which may include a proof of work, is sent by APIS—msg1 FIG. 14—, prior to the payment transaction, along with the indication of the type of proof of work (i.e. 111 in the example) and one or more transaction identifiers (TID), to the terminal of the person who will have to receive the payments (and hence to APIB), where, without being processed by APIB, msg.1 will remain stored in a secure area.

When the user A must pay B, who has Crypto1 on his terminal, a transmission from B to A—MSG2 of FIG. 15—will be activated over a secure channel for transmitting a message containing Crypto1, possibly with the indication of the type of proof of work used for generating Crypto1, and the SGN code extracted from the random number M1 generated by APIB of the terminal of B as previously described.

The message from B to A optionally includes two fields: PD and Service Data. The PD (Product Data) field contains information about the purchased product and the price to be paid. The Service Data field contains service information such as date and time (time stamp), in addition to the transaction identifier (TID) generated by APIS.

Some information that must be included in the Service Data of MSG2 of FIG. 15 or FIG. 16 includes the invoicing tax data of the vendor B, the data indicating a specific payment location of B (e.g. a cash desk) and the data of a fidelity card program active at the point of sale of B. The integration of such data, i.e. a) tax data of B, b) data indicating the type of fidelity card program active at the point of sale, c) data indicating a specific payment location of B (e.g. a cash desk), with the payment data constitutes a characteristic element of the present invention. The transmission of said message (MSG2 FIG. 15) from B to A may occur over a secure web connection (IP protocol) or, if the two are located in the same environment, through RFID (Radio-Frequency IDentification) or Bluetooth or WiFi or 3G, 4G or 5G mobile connection, or via generation of a Qcode of MSG1 by APIB, which will then be taken by the terminal of A, e.g. a smartphone, which in this case will be equipped with a camera.

The random number M1 is generated by means of a secure algorithm ALG. Such algorithm runs on both APIB and APIS. M1 serves to generate the electronic signature SGN to be used for signing the transaction, so that, when APIS receives said message through APIA (or directly from APIB), it will generate a corresponding countersignature CSGN to be sent to APIB in order to validate the transaction and certify the completed payment. FIG. 15 and FIG. 16 illustrate the two different options: in the former, SGN travels in the message MSG2, whereas in the latter it travels in the message MSG11 and APIS receives it directly from APIB.

As already illustrated, when SGN is received by APIS, the latter will generate different M1s until it occurs that the digits of the received SGN are exactly equal to those of the SGN extracted from the last locally generated M1. When the message MSG2 is received by A, the latter will authorize the transaction by entering a security code of the payment service, a fingerprint (or at least another biometric datum), and will send the message MSG3 to APIS. The message MSG3 includes in the MILE field, if desired by A, the numbers of the fidelity cards of A that may benefit from a credit of points after the purchase in progress. The selection of the number of the fidelity card of A, which number is stored in APIA, may occur automatically thanks to the Service Data field of MSG2, which indicates the active fidelity programs at the point of sale B, whether physical or on-line. By using the information received in MSG3—FIG. 15 and FIG. 16—and using the data stored for each user during the service configuration, APIS will request to withdraw an amount from the payment card of the user A, equal to the payment due, by using the common interbank payment procedures: for example, for the payment card, it is possible to use the EMV technical standard based on the ISO/IEC 7816 standard for smart cards or on the ISO/IEC 14443 standard for contactless cards, or evolutions thereof. Once the procedure for withdrawing the amount due from the payment card of A has been carried out, a bank transfer for the same amount will be made by APIS in favour of B by using the IBAN number of B, or another type of transfer, should a bank transfer be unavailable. If APIS has direct access to the payment account of A, it may directly make a bank transfer from the account of A in favour of B.

After having made the payment to B, APIS will send to APIB the digits that constitute CSGN, i.e. the countersignature of SGN. APIB will verify that CSGN is compatible with the SGN generated as a complement of the same random number M1; if the verification is passed, it will be reasonably certain that the message received was signed by APIS as a guarantee for the payment request. In the absence of such a guarantee mechanism consisting of CSGN, APIB might receive a false message as a payment confirmation, and thus be swindled. The synchronization between the two instances of the same software algorithm ALG running on both APIB and APIS may occur in several ways, e.g. by means of the transaction number TID. The available solutions are many, this description only tackling one easily implementable example. For better security, SGN and CSGN may be sent encrypted even only with a symmetric key between APIB and APIS. This aspect of payment security for the vendor B and fast verification through SGN and CSGN allows for fast implementation of the payment method and system described herein with a high level of security for B.

In a high-security alternative embodiment, B is required to enter some random digits, e.g. four or more digits, which will constitute what we have already called PON—Personal Obfuscation number—that will be sent to APIS instead of SGN over a secure and/or encrypted connection. The PON is used by the device of the user B in order to calculate the number M1 with an input from the user that increases its chaotic component. The number M1 will be even more difficult to determine because it will have been calculated on the basis of the PON, resulting in increased system security. The PON can be used in many ways for calculating M1 with a large random component, as previously described. By way of example, the PON number serves to increment the clock of the system that generates M1 in an unpredictable manner. The number M1 as a whole will never go through the communication channels of the network, and the user B will receive the payment confirmation message from APIS, in the CSGN field.

In an alternative embodiment, MSG2—FIGS. 15 and 9—may also contain information about the product or service purchased by A. This field will be indicated as PD (Product Data). In addition to the price to be paid, entered by B and included in the message MSG2, PD may also include specific information relating to the purchased product, which information—contained in the PD field—will be associated with the date and time contained in the Service Data field at the end of the transaction.

The APIs on the terminal of A (APIA), after having received the data of B—MSG2 FIGS. 15 and 9—and having verified the compliance of any proof of work of Crypto1, will include the received data into a new message: MSG3. The Crypto1, PON—or, as an alternative, SGN—, Service Data and TID fields will be included in the new message MSG3 in a transparent manner. In some alternative embodiments, some data may be compacted into a single field or deleted: for example, the time stamp, hereafter referred to as Time, and the TID may be contained in the same field of the message or, in some embodiments, may be deleted, in which case the transaction time could be set by the clock of the receiving apparatus.

In addition to the above-listed data of MSG2, the new message generated by APIA (and called MSG3) will also include the PAN (personal account number):

1) the PAN will contain the identifier of the user A—whether a number and/or biometric data of A—and possibly one or more characteristic numbers of the terminal of the user A, both encrypted by using, for example, a symmetric key between APIA and APIS.

2) alternatively, the PAN will contain the identifier of the user A—whether a number and/or biometric data of A—encrypted by using a sequence of hashing functions, as previously provided for Crypto1, with the production of a proof of work and possibly one or more characteristic numbers of the terminal of the user A.

3) alternatively, the PAN will contain a combination of data identifying A, such as the tax code and payment card number (or a pointer to the card number, if already registered into APIS) and/or other identification numbers and/or biometric data of A and possibly one or more characteristic numbers of the terminal of the user A, everything optionally encrypted by means of, for example, a symmetric key between APIA and APIS or an hashing function, as done for Crypto1.

The three above cases indicate different contents in the field that will hereafter be synthetically referred to as PAN. Such PAN field will be included in the message generated by APIA and sent to APIS. In all three cases, as aforesaid, at least one number of the user terminal of A (IMEI, IMSI, or the like) must be associated with the PAN. MSG3 will include the body of the message MSG2, in addition to the secret code entered by A and required in order to enable the payment transaction. Such secret code is generically indicated as PIN: Personal Identification Number, i.e. a sort of secret password. Normally, this PIN should not coincide with the PIN of the payment card, and typically is a new PIN specific for the payment service described herein. As an alternative to entering the PIN, and in addition to a biometric identification datum such as, for example, a fingerprint, the user could simply pronounce a keyword subject to voice recognition. Such keyword, if recognized by the voice recognition system, will replace the PIN, and its numerical coding will travel in the same PASS field in which the PIN is normally communicated. Other biometric data may be associated with voice or fingerprints.

The detailed description of the present invention allows using an authentication between $\alpha$ and $\beta$ as described in FIGS. 5, 8 and 9, wherein the respective identities of $\alpha$, $\beta$ and $\delta$ are User Id #2 and/or a userID* #2 that, as aforesaid, is modified prior to transmission. FIGS. 6 and 7 illustrate the operation with authentication without a PON. Such schemes, when PON input by the user is included, will change as shown in FIGS. 17 and 18, respectively.

The user A, after the authentication, will select the fidelity program joined by the vendor B, the information about which has arrived at A through the Service Data. The selection of the fidelity program may be automatic on APIA. The information about the number of A's card for the selected fidelity program is stored into the MILE field of MSG.3—FIG. 15 or FIG. 16. This message—MSG3 FIG. 15 or FIG. 16—generated by APIA is sent to APIS. Upon receiving MSG3, APIS will verify if the identity of Crypto1 is coherent with the generated TID. It will verify that the PAN is correct and the information in the PASS field is coherent with the received or decrypted PAN. If the information contained in the PASS field is wrong, APIS will have to ask APIA to send such information again. If the other verifications are unsuccessful, the payment request will have to be rejected.

By using the information received in MSG3 and the data stored for each user during the configuration of the service, APIS will request the payment of the amount due from the IBAN number of A or from the payment card of A in accordance with the interbank payment procedures. The APIS system will send MSG4 to APIB in order to certify the completed payment. MSG4 will contain the CSGN number for the very purpose of certifying the transaction. CSGN can only be generated by APIS, so that APIB will have a confirmation that the transaction and the payment have been really carried out. If CSGN is encrypted, then APIB will have to decrypt the CSGN field and extract the clear CSGN number. APIS will verify that CSGN is actually the number complementary to SGN and, if it is, will accept the message MSG4 of FIG. 15 and FIG. 16 as a confirmation of the payment made by A. The PD field of the message MSG4 of FIG. 15 and FIG. 16 will also contain, in addition to the price actually paid, further data relating the invoicing of the product, generated by APIS on the basis of the data collected from APIB.

The MILE field of the message MSG4 of FIG. 15 and FIG. 16 that contains the data of the fidelity card of APIA will allow crediting, based on the amount spent, points of the fidelity program joined by the vendor B and participated in by the user A. The points will be communicated from APIB to APIA in MSG.5 of FIG. 15 and FIG. 16, possibly together with a receipt for fiscal purposes, in the PD field, with the indication of the amount paid.

The specific information about the purchased product and the paid price is information that—being derived from the PD field—will be associated with the date and time of completion of the payment transaction. Such information may be encoded into a cryptogram, which will be called Crypto2, through the use of a method similar to that used for generating Crypto1. The input of the hashing function will be, in this case, the following data: tax data and paid amount, product specification, date and time. The output will consist of Crypto2. Crypto2 is the electronic document which is useful to the purchaser A for acquiring and claiming the warranty on the purchased product.

Crypto2 must therefore be stored by APIA, which cannot modify it. The manufacturer of the purchased product, or another authorized entity, will recognize Crypto2 as the electronic document that certifies the purchase of a given product on a given date, since it is univocal and non-modifiable by A. The interfaces between APIB and the system for storing the points of the fidelity program, just like the interfaces between APIB and the invoicing system, are not objects the present invention.

The following will provide some further explanatory details about FIGS. 5 to 9 and 17, 18.

With reference to FIG. 5:
$\alpha$ generates the random number M1 and extracts SGN
$\alpha$ sends SGN to $\beta$
$\beta$ receives SGN from a after various other possible receptions in the network. $\beta$ generates many M1s by using the same method as used by a until it finds a match with the received SGN.
$\beta$ extracts CSGN and sends CSGN to $\alpha$
If CSGN corresponds, then the counterpart $\beta$ will be authenticated.
$\beta$ can manage different users as $\alpha$ With reference to FIGS. 6 and 17:
User ID #2 is stored by $\alpha$ and is not modified by $\alpha$
User ID #2==hashing [(User ID #1)+CSGN+Un]
$\beta$* is a third party that may receive CSGN, and is optional
Un is a code specific for the n-th final user, and may be optional.

With reference to FIGS. 7 and 18:
User ID #2=hashing [(User ID #1)+CSGN+Un]
Hash (User ID #2+PIN+biometric data+other)= =User ID* #2
User ID #2 is stored by a, but is modified by a with the inclusion of the PIN and/or biometric data of the user and/or other data, such as the serial number of the terminal and/or the telephone number.

APIS

β* is a third party that may receive CSGN, and is optional.

When it receives User ID* #2, different from User ID #2 sent, APIS will calculate User ID* #2 by using the same procedure as used by a and will verify the correspondence.

Un is a code specific for the n-th final user, and may be optional.

With reference to FIG. 8:

PON input (entered by the user of terminal α)

α sends PON to β

β receives SGN from a after other possible receptions in the network. β generates M1, SGN and CSGN on the basis of the PON obtained through the same system available on α

β sends CSGN to α

If CSGN matches the one generated by α, then the counterpart β will be authenticated.

β can manage different users as α

With reference to FIG. 9:

PON input (provided by user α), PON is modified by δ

The modified PON is sent to β and α

β generates M1, SGN and CSGN on the basis of the received PON

β sends SGN to α

β sends CSGN to δ

α receives SGN and generates many M1s until it finds the one that matches the received SGN α sends CSGN to δ

δ will carry out a specific action, if the CSGN received from a matches the CSGN received from β

The present invention can advantageously be implemented by means of a computer program comprising coding means for carrying out one or more steps of the method, when this program is executed on a computer. It is therefore understood that the protection scope extends to said computer program and also to computer-readable means comprising a recorded message, said computer-readable means comprising program coding means for carrying out one or more steps of the method, when said program is executed on a computer.

The above-described non-limiting example of embodiment may be subject to variations without departing from the protection scope of the present invention, including all equivalent designs known to a man skilled in the art.

The elements and features shown in the various preferred embodiments may be combined together without however departing from the protection scope of the present invention.

This invention allows implementing a system and a method for money payment and withdrawal which can be adapted to a wide variety of user terminals with a very high level of security for both the payer and the payee, also thanks to a specific transaction warranty for the payee.

From the above description, those skilled in the art will be able to produce the object of the invention without introducing any further construction details.

The invention claimed is:

1. A system for secure authentication of a user's identity in an electronic system for banking transactions, said system comprising at least one first user apparatus subject to said secure authentication, and one or more further apparatuses bidirectionally communicating with each other and with said first apparatus, wherein:

said first apparatus (α) comprises a first processor configured to generate a random number, divide the random number into a first part and a second part, which are complementary and subsets of said random number, and send the first part to a second apparatus (β);

said second apparatus (β) comprises a second processor configured to generate a random number by:

(a) generating a pseudo-random number between 0 and 0.4;

(b) determining, with said pseudo-random number, a number $K_n$ between 3.6 and 4;

(c) calculating an expression $X_{n+1}=K*X_n*(1-X_n)$, with an initial value of $X_n$ between 0 and 1;

(d) calculating one or more cryptographic non-invertible transformation functions (hash) of (Xn+1);

(e) dividing a result of the hash of $X_{n+1}$ into a first part and a second part;

(f) comparing the first part computed by the second apparatus with the first part received from the first apparatus;

(g) determining whether the first part computed by the second apparatus matches the first part received from the first apparatus;

based on the first part computed by the second apparatus not matching the first part received from the first apparatus, repeating steps (c) through (g); and based on the first part computed by the second apparatus matching the first part received from the first apparatus, sending the second part of the hash of $X_{n+1}$ to the first apparatus, thereby attaining said secure authentication of the identity of a user associated with said first apparatus.

2. The system for secure authentication as in claim 1, wherein said first processor of said first apparatus (α) that generates the random number is further configured to:

receive a random code and send it to said second apparatus (β), said random code being variable at every banking transaction and being suitable for being combined with said random number.

3. The system for secure authentication as in claim 1, wherein said first processor of said first apparatus (α) that generates the random number is further configured to:

receive a random code;

normalize the random code to a value between 0 and 1;

send the normalized random code to said second apparatus (β), said normalized random code being variable at every banking transaction; and calculate a logic combination between said normalized random code and said expression $X_{n+1}=K*X_n*(1-X_n)$.

4. The system for secure authentication as in claim 1, wherein said first processor of said first apparatus (α) or said second processor of said second apparatus (β) that generates the random number is further configured to:

obtain a sum of said pseudo-random number and a user-specific secret number; and iteratively calculate one or more cryptographic non-invertible transformation functions of said sum until said random number is determined.

5. The system for secure authentication as in claim 1, wherein said first processor of said first apparatus (α) or said second processor of said second apparatus (β) that generates the random number is further configured to:

receive a random code obtain a sum of said random code and a user-specific secret number;

calculate a logic combination between said sum and said pseudo-random number; and iteratively calculate one or more cryptographic non-invertible transformation functions of said logic combination in order to determine said random number.

6. The system for secure authentication as in claim 1, wherein said first processor of said first apparatus (α) or said second processor of said second apparatus (β) that generates the random number or further configured to:
- receive a random code;
- normalize said random code to a value between 0 and 1;
- calculate a logic combination between said normalized random code, a result of said expression $X_{n+1}=K*X_n*(1-X_n)$, and a user-specific secret number; and
- iteratively calculate the one or more cryptographic non-invertible transformation functions of said logic combination in order to determine said random number.

7. The system for secure authentication as in claim 1, wherein said first processor of said first apparatus (α) or said second processor of said second apparatus (β) that generate the random number is further configured to:
- receive a random code;
- obtain a sum of said random code and a user-specific secret number;
- calculate a logic combination between said sum and said pseudo-random number, thereby obtaining said random number.

8. The system for secure authentication as in claim 1, wherein said first processor of said first apparatus (α) or said second processor of said second apparatus (β) that generates the random number is further configured to:
- receive a random code;
- normalize said random code to a value between 0 and 0.4
- determine, with said random code, the number Kn, which is between 3.6 and 4.

9. The system for secure authentication as in claim 1, wherein said first part and, respectively, second part of the random number comprise any number of equal digits.

10. The system for secure authentication as in claim 1, wherein said system further includes:
- at least one payer user apparatus, at least one vendor user apparatus, a system and/or apparatus of a service provider for making a payment from said payer user apparatus to said vendor user apparatus;
- wherein said at least one payer user apparatus is adapted to carry out the functions of said first apparatus (α), and in that said vendor user apparatus and/or said system and/or apparatus of a service provider are adapted to carry out the functions of said second apparatus (β).

11. The system for secure authentication as in claim 10, wherein the system further includes an encryption system adapted to communicate said random number, said first and second parts and said random code in encrypted form.

12. The system for secure authentication as in claim 10, wherein said system and/or apparatus of the service provider is adapted to generate a new user identity at every banking transaction, as a combination of said first and/or second parts and/or said random code with clear and/or confidential data of the user's identity, and to iteratively apply said cryptographic non-invertible transformation function to said combination at every banking transaction, connected to a preceding transaction.

13. The system for secure authentication as in claim 2, wherein said random number, or a concatenation of said random number, is used as a symmetrical encryption key between said first apparatus (α) and said second apparatus (β) exchanging the random code over a secure communication channel.

* * * * *